(12) United States Patent
Okawa et al.

(10) Patent No.: US 7,743,215 B2
(45) Date of Patent: Jun. 22, 2010

(54) CACHE-MEMORY CONTROL APPARATUS, CACHE-MEMORY CONTROL METHOD AND COMPUTER PRODUCT

(75) Inventors: Tomoyuki Okawa, Kawasaki (JP); Hiroyuki Kojima, Kawasaki (JP); Hideki Sakata, Kawasaki (JP); Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 421 days.

(21) Appl. No.: 11/980,386

(22) Filed: Oct. 31, 2007

(65) Prior Publication Data

US 2008/0162818 A1 Jul. 3, 2008

(30) Foreign Application Priority Data

Dec. 28, 2006 (JP) ............................. 2006-356474

(51) Int. Cl.
*G06F 12/00* (2006.01)
(52) U.S. Cl. .................. 711/122; 711/143; 711/144; 711/145; 711/156; 711/165
(58) Field of Classification Search ........................ None
See application file for complete search history.

(56) References Cited

U.S. PATENT DOCUMENTS

| | | | | |
|---|---|---|---|---|
| 5,045,996 A | * | 9/1991 | Barth et al. .................. 711/143 |
| 5,918,245 A | * | 6/1999 | Yung ........................... 711/122 |
| 7,076,613 B2 | * | 7/2006 | Peir et al. .................... 711/141 |
| 7,096,322 B1 | * | 8/2006 | Sollom et al. ................ 711/143 |
| 2004/0268054 A1 | * | 12/2004 | Peir et al. .................... 711/144 |
| 2006/0155934 A1 | * | 7/2006 | Rajamony et al. ........... 711/134 |
| 2008/0301368 A1 | * | 12/2008 | Kojima et al. ................ 711/119 |

FOREIGN PATENT DOCUMENTS

| | | |
|---|---|---|
| EP | 470574 A2 * | 2/1992 |
| JP | 8-006852 | 1/1996 |
| WO | WO 2004/046932 | 6/2004 |

* cited by examiner

*Primary Examiner*—Jack A Lane
(74) *Attorney, Agent, or Firm*—Staas & Halsey LLP

(57) ABSTRACT

A cache-memory control apparatus controls a level-1 (L1) cache and a level-2 (L2) cache having a cache line divided into a plurality of sub-lines for storing data from the L1 cache. The cache-memory control apparatus includes a control-flag adding unit, an L1 cache control unit, and an L2 cache control unit. The control-flag adding unit provides an SP flag to each of the sub-lines. The L1-cache control unit acquires an access virtual address, and, when there is no data at the access virtual address, outputs an L2 cache-access address to the L2-cache control unit. The L2-cache control unit switches the SP flag based on a virtual page number in an L1 index and a physical page number in an L2 index. Based on the SP flag, corresponding one of the sub-lines is written back to the L1 cache.

18 Claims, 29 Drawing Sheets

FIG.3

L1 CACHE
12a

| L1 INDEX (VA2) | PHYSICAL PAGE NUMBER (PA4) | DATA |
| --- | --- | --- |
| ⋮ | ⋮ | ⋮ |
| VA2(a) | PA4(a) | DATA(a0) |
| VA2(b) | PA4(a) | DATA(a1) |
| ⋮ | ⋮ | ⋮ |

FIG.4

TLB
12b

| VIRTUAL PAGE NUMBER (VA4) | PHYSICAL PAGE NUMBER (PA4) |
| --- | --- |
| ⋮ | ⋮ |
| VA4(a) | PA4(a) |
| VA4(b) | PA4(a) |
| ⋮ | ⋮ |

FIG.5

| L2 INDEX (PA2) | REGISTERED PHYSICAL ADDRESS (PA1) | REGISTERED VIRTUAL INDEX ADDRESS (VA21) | SUB-LINE 0 STATUS | SP FLAG 0 | SUB-LINE 1 STATUS | SP FLAG 1 | SUB-LINE 0 DATA | SUB-LINE 1 DATA | |
|---|---|---|---|---|---|---|---|---|---|
| ... | ... | ... | ... | ... | ... | ... | ... | ... | |
| PA2(a) | PA1(a) | VA21(a) | STATUS DATA | 0 | STATUS DATA | 1 | DATA(a0) | DATA(a1) | |
| PA2(b) | PA1(b) | VA21(f) | STATUS DATA | 0 | STATUS DATA | 0 | DATA(b0) | DATA(b1) | L2 CACHE 13a |
| ... | ... | ... | ... | ... | ... | ... | ... | ... | |

FIG.12
VA (VIRTUAL ADDRESS)
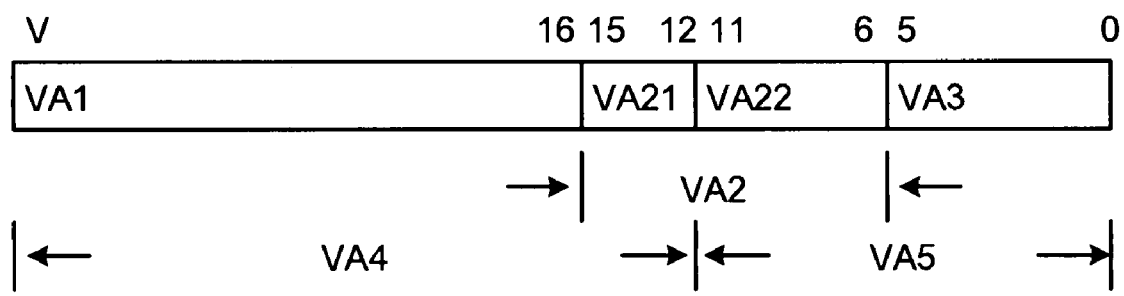
PA (PHYSICAL ADDRESS)
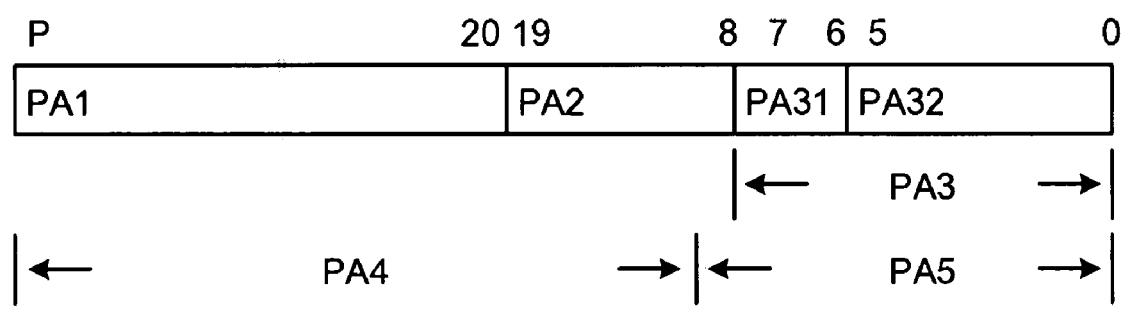

FIG.24
VA (VIRTUAL ADDRESS)
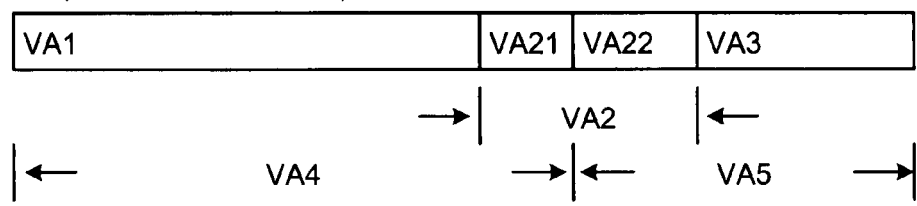
PA (PHYSICAL ADDRESS)
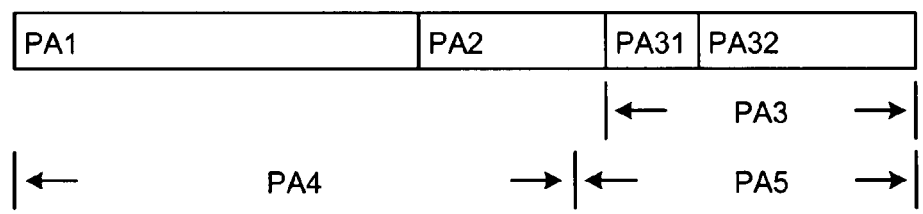

FIG.25

| L2 INDEX | | | | | | | |
|---|---|---|---|---|---|---|---|
| ..... | PA1 | VA21 | SUB-LINE0 ST | SUB-LINE1 ST | SUB-LINE2 ST | SUB-LINE3 ST | SUB-LINE0 DATA····SUB-LINE3 DATA |
| ..... | | | | | | | |

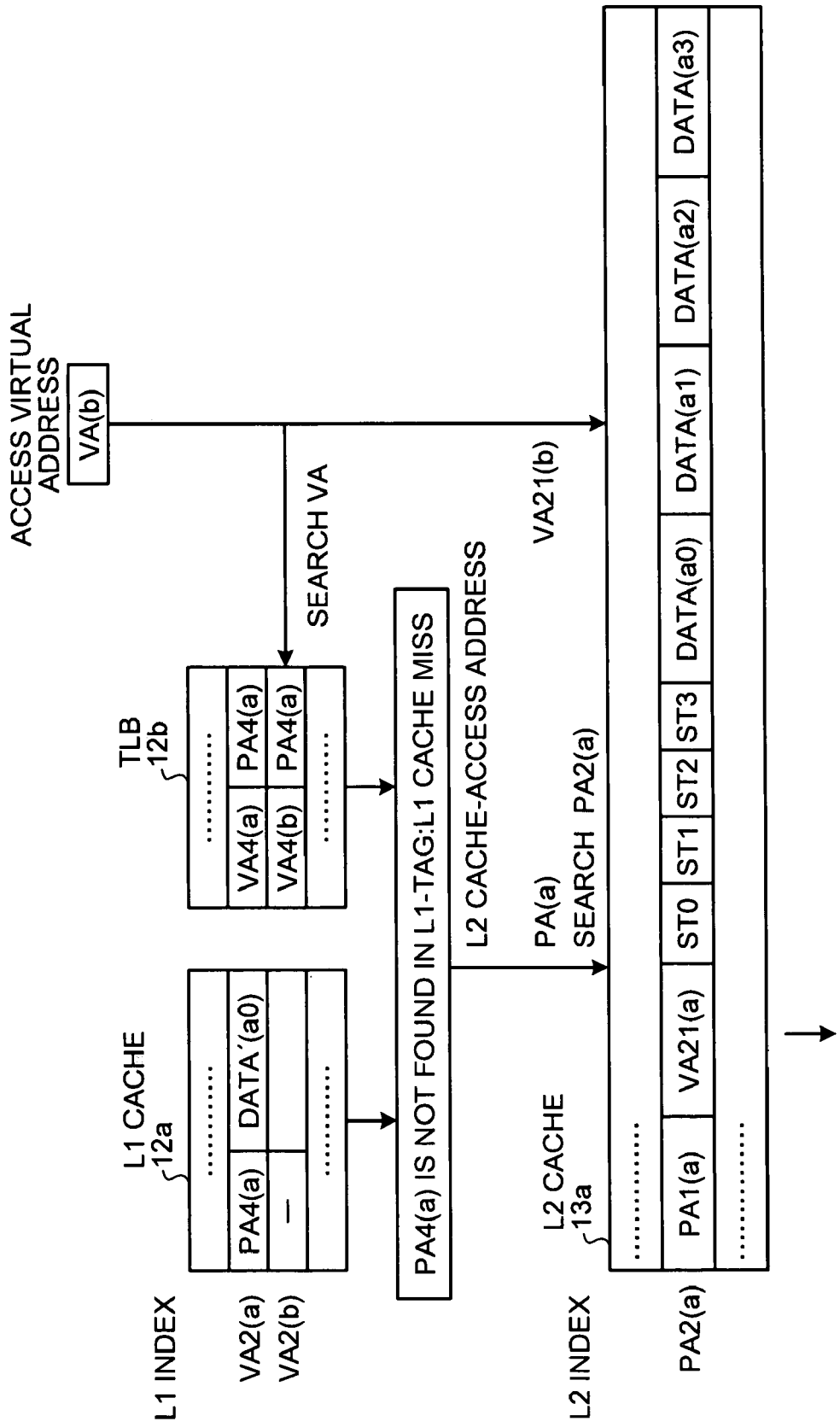

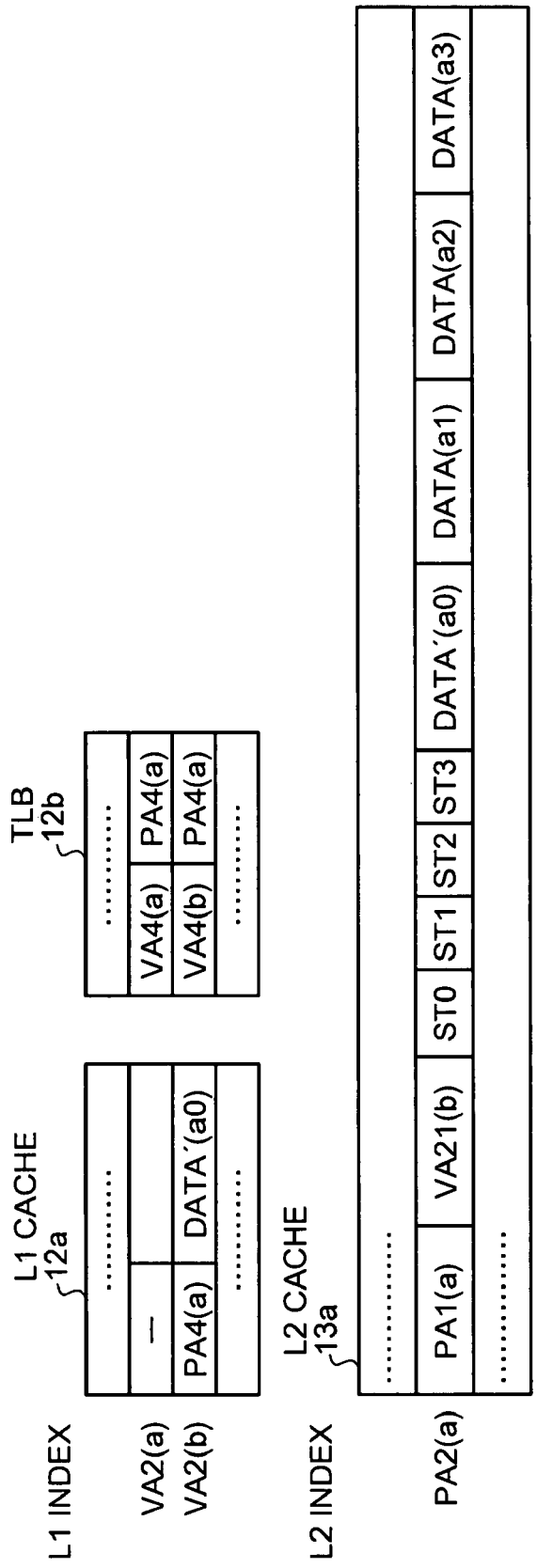

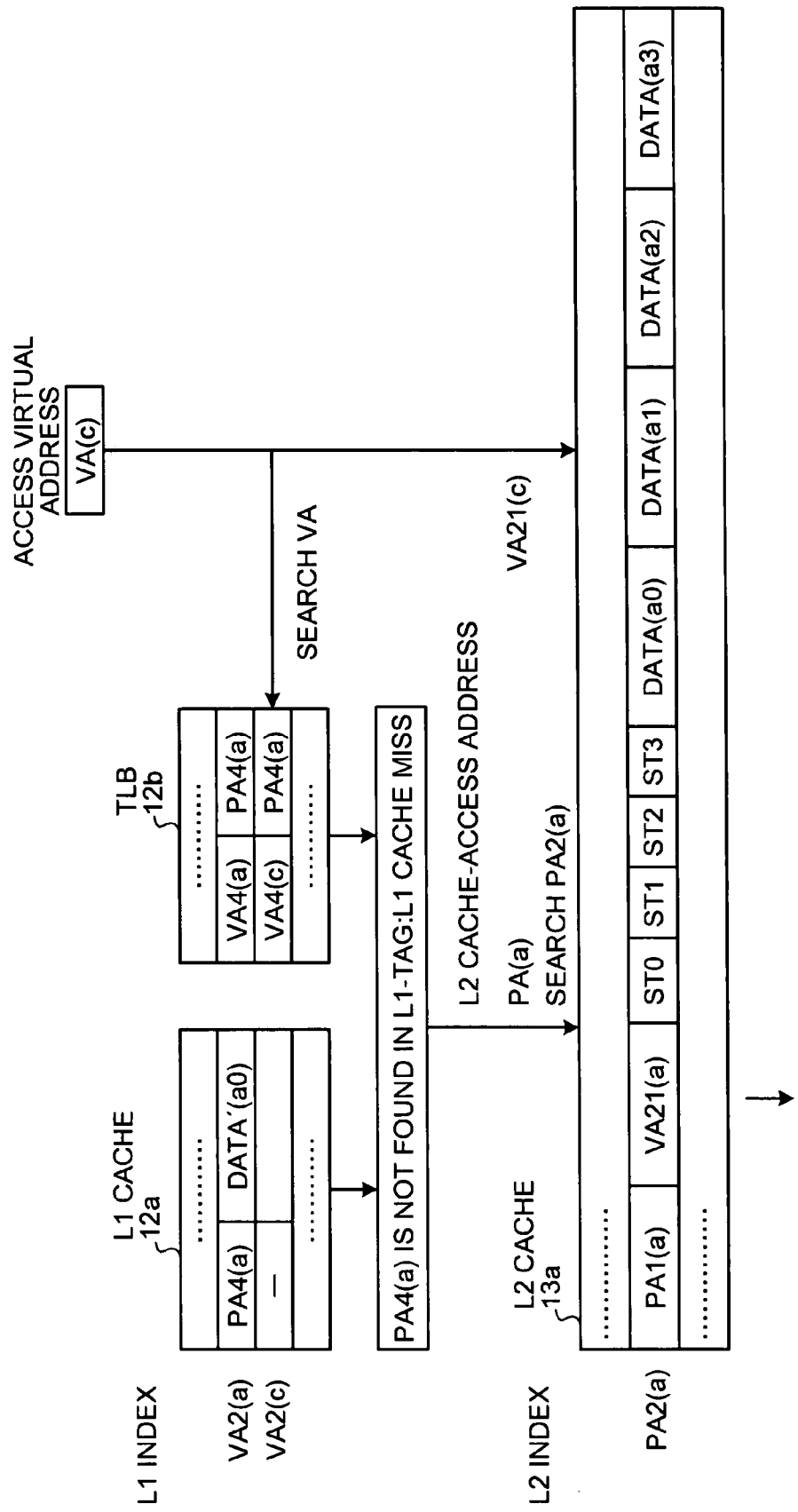

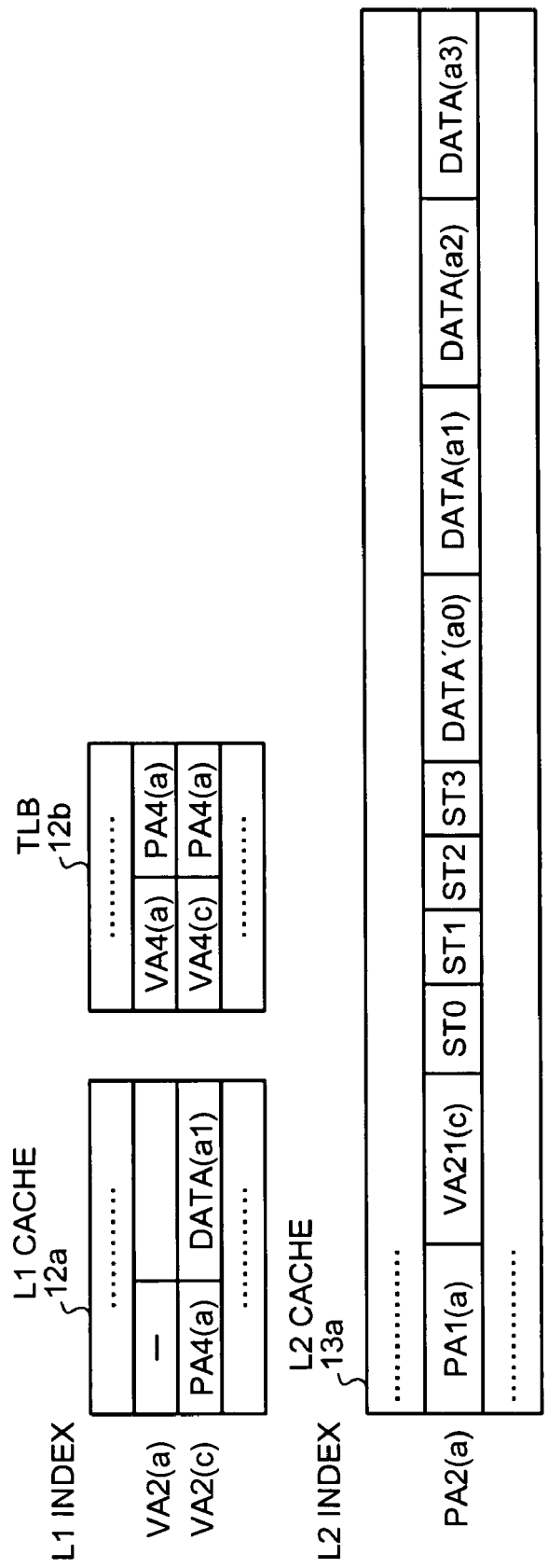

CACHE-MEMORY CONTROL APPARATUS, CACHE-MEMORY CONTROL METHOD AND COMPUTER PRODUCT

BACKGROUND OF THE INVENTION

1. Field of the Invention

The present invention relates to a technology for controlling a multilevel cache memory.

2. Description of the Related Art

A cache memory has been used to temporarily store data and instructions expected to be needed by a processing unit such as a central processing unit (CPU), thereby reducing access latency in a main memory or a bus. That is, a cache memory can alleviate the performance gap between a processing device and a computing device. Among such cache memories is a multilevel cache memory that includes, for example, a level-1 (L1) cache and a level-2 (L2) cache. The L2 cache contains a copy of the contents of the L1 cache. Reference may be had to, for example, International Publication No. WO 2004/046932, and Japanese Patent Application Laid-Open No. H8-6852.

Such a cache is controlled so that a synonym state, that is, a state in which a physical address is registered with a plurality of different virtual addresses, does not arise in the L1 cache. A virtual address (corresponding to an index section of the L1 cache) is registered to an L2 cache tag in the L2 cache. The L2 cache has a cache line that is divided into a plurality of sub-lines each of which contains data. The data is managed by each sub-line.

Structures of the virtual address and the physical address are described below. FIG. 24 is a diagram for explaining the structure of the virtual address and the physical address. VA is a virtual address, and PA is a physical address. VA1 and PA1 are bits higher than indices of the L1 and L2 caches, respectively. VA2 and PA2 are the indices of the L1 and L2 caches, respectively.

VA2 is divided into VA21 (a part that belongs to a virtual page number) and VA22 (a part that belongs to an offset in page). VA3 and PA3 are offsets in cache line of the L1 cache and the L2 cache, respectively. In the L2 cache, PA3 is divided into sub-lines PA31 and PA32. PA31 is a sub-line number, and PA32 is an offset in sub-line.

VA4 and PA4 are a virtual page number and a physical page number, respectively. VA5 and PA5 are offsets in page. When virtual address VA is translated into physical address PA (or physical address PA is translated into virtual address VA), data (bits) stored in VA5 or PA5 is not transformed. In other words, data in VA5 and data in PA5 are identical.

A data structure of the conventional L2 cache is described. FIG. 25 is a diagram of a data structure of the L2 cache according to the conventional technology. PA1 is a registered physical address (corresponding to PA1 shown in FIG. 24). VA21 is a registered virtual index address (corresponding to VA21 shown in FIG. 24). SUB-LINE x ST is a status of a corresponding sub-line, and SUB-LINE x DATA is cache data of a corresponding sub-line, where x is a number. The status contains data that indicates whether the L1 cache or the L2 cache has data for a corresponding sub-line, or data that indicates whether data for the corresponding sub-line is updated.

The L2 cache shown in FIG. 25 employs a method, as one of examples, for managing four sub-lines in an L2 cache line. When a line size of the L1 cache is $\alpha$, and a line size of the L2 cache is $\beta$, a relation between $\alpha$ and $\beta$ is $\alpha \times 4 = \beta$.

Data in the L2 cache is managed by each sub-line. However, because of a resource limitation at an L2 cache-tag section, a common virtual address VA is allocated to four sub-lines. Therefore, when a write back is executed for resolving the synonym state, an entire of the L2 cache line (all of the four sub-lines) becomes a target to be controlled. If each sub-line has its own virtual address VA, it is possible to independently control data by each sub-line (i.e., no interference between sub-lines occurs). However, a resource amount that that has to allocate to the L2 cache-tag section increases in parallel to the number of sub-lines, so that it is impossible to allocate a virtual address VA to each of the sub-lines in the actual state.

A method of controlling cache memory is described according to the conventional technology. FIGS. 26 to 30 are diagrams for explaining the method of controlling the cache memory according to the conventional technology. Three cases are described with reference to FIGS. 26 to 30. In a first case, where data having a physical address PA(a) is register to the L1 cache with a virtual address VA(a), the L1 cache is accessed with the virtual address VA(a). In a second case, where data having a physical address PA(a) is register to the L1 cache with a virtual address VA(a), the L1 cache is accessed with a virtual address VA(b). In a third case, where data having a physical address PA(a) is register to the L1 cache with a virtual address VA(a), the L1 cache is accessed with the virtual address VA(c). A translation lookaside buffer (TLB) shown in FIGS. 26 to 30 stores correspondence data between the virtual address (virtual page number VA4) and the physical address (physical page number PA4).

In the first case, where data having the physical address PA(a) is register to the L1 cache with the virtual address VA(a), the L1 cache is accessed with the virtual address VA(a). As shown in FIG. 26, the L1-cache control unit (not shown) translates an access virtual address (a virtual address to be accessed) VA(a) to a physical page number PA4(a) by referring to the TLB, and searches for the physical page number PA4(a) corresponding to the L1 index of VA2(a). If there is a hit, i.e., L1 cache hit, DATA(a) stored in the L1 cache is returned.

In the second case, where data having the physical address PA(a) is register to the L1 cache with the virtual address VA(a), the L1 cache is accessed with the virtual address VA(b). As a physical page number corresponding to VA(b), the physical page number PA4(a) equal to VA(a) is registered to the TLB, and an offset in page has an identical sub-line number in the L2 cache (for example, sub-line 0). In an example shown in FIG. 27, a registered physical address PA1(a) excluding bits of the L2 index section or lower bits is registered to the L2 cache tag, and data for the L2 line size (i.e., data common to sub-lines) is registered to the L1 cache as an index of VA21(a).

Moreover, a status for each sub-line that indicates whether data having PA1(a) and VA21(a) is in the L2 cache (corresponding to ST0 to ST3) is stored in the L2 cache tag. DATA (a0) to DATA(a3) is in sub-line 0 to sub-line 3 in a single L2 cache line, respectively. Sub-lines 0 to 3 belong to a common line. L2 cache contains DATA(a0) to DATA(a3).

As shown in FIG. 27, the L1-cache control unit translates the access virtual address VA(b) to the physical page number PA(a) by referring to the TLB. Because a physical page number corresponding to the L1 index of VA2(b) is not in the L1 cache, an L1 cache miss occurs. When an L1 cache miss occurs, the L1-cache control unit accesses the L2 cache.

As shown in a bottom half in FIG. 27, data for the physical address PA (a) is registered to the L2 cache as the virtual address VA21(a) that is different from a requested virtual address VA21(b), the L2-cache control unit (not shown) outputs a command for deleting data, that corresponds to all the sub-lines and has the same VA21(a) registered on the L1 index, to the L1-cache control unit to delete the data from the L1 cache. When DATA(ax) is updated to DATA'(ax) in-L1 cache, the L1-cache control unit and the L2-cache control unit write back, in cooperation with each other, updated data to the L2 cache.

After the latest data is written back to the L2 cache, the L2-cache control unit registers data to the L2 cache by using an index of VA21(b), and returns data corresponding to the requested sub-line to the L1 cache (see, a bottom half in FIG. 28).

The L1-cache control unit stores data acquired from the L2-cache control unit in the L1 cache, and outputs the stored data to a requestor (i.e., a not-shown command control unit) as shown in an upper half in FIG. 28.

In the third case, where data having the physical address PA(a) is register to the L1 cache with the virtual address VA(a), the L1 cache is accessed with the virtual address VA(c). As a physical page number corresponding to VA(c), the physical page number PA4(a) equal to VA(a) is registered to the TLB, and a sub-line number of the L2 cache of an offset in page is not identical. In an example shown in FIG. 29, similar to the example shown in FIG. 27, the registered physical address PA1(a) excluding bits of the L2 index section or lower bits is registered to the L2 cache tag, and data for the L2 line size (i.e., data common to sub-lines) is registered to the L1 cache as an index of VA21(a).

As shown in FIG. 29, the L1-cache control unit translates the access virtual address VA(c) to the physical page number PA(a) by referring to TLB. Because a physical page number corresponding to the L1 index of VA2(b) is not in the L1 cache, an L1 cache miss occurs. When an L1 cache miss occurs, the L1-cache control unit accesses the L2 cache.

As shown in a bottom half in FIG. 29, data for the physical address PA(a) is registered to the L2 cache as the virtual address VA21(a) that is different from a requested virtual address VA21(c), the L2-cache control unit outputs a command for deleting data, that corresponds to all the sub-lines and has the same VA21(a) registered on the L1 index, to the L1-cache control unit to delete the data from the L1 cache. When DATA(ax) is updated to DATA'(ax) in L1 cache, the L1-cache control unit and the L2-cache control unit write back, in, cooperation with each other, updated data to the L2 cache.

After the latest data is written back to the L2 cache, the L2-cache control unit registers data to the L2 cache by using an index of VA21(c), and returns data corresponding to the requested sub-line to the L1 cache (see, a bottom half in FIG. 30).

The L1-cache control unit stores data acquired from the L2-cache control unit in the L1 cache, and outputs the stored data to the requestor as shown in an upper half in FIG. 30.

As described above, a cache line of the L2 cache is divided into a plurality of blocks, that is, sub-lines, which makes it possible to manage data by each sub-line.

However, because a common VA21 is used as an L1 index VA21 registered on the L2 cache tag according to the above conventional technology, at a step of re-register of the L1 index VA21 for resolving the synonym state in a process of a requested sub-line, an operation for deleting data registered to the L1 index before re-registered from the L1 cache (write back) is performed for all of the sub-lines in a single L2 cache line.

To solve the above problem, it is conceivable that the L1 index VA21 is set for each sub-line of the L2 cache. However, because data amount stored in the L2 cache tremendously increases in parallel to the number of sub-lines, the idea is unrealistic.

It is significantly important to address an issue for effectively utilizing the limited source of the L2 cache, and eliminating an unnecessary write back of data (i.e., a process of deleting (writing back) data from the L1 cache corresponding to any other sub-line in a line where the requested sub-line)

SUMMARY OF THE INVENTION

It is an object of the present invention to at least partially solve the problems in the conventional technology.

According to an aspect of the present invention, a cache-memory control apparatus that controls a first cache and a second cache having a cache line that is divided into a plurality of sub-lines each for storing data from the first cache, includes a flag adding unit that adds a control flag to each of the sub-lines, a flag switching unit that receives a request for data, and switches, when requested data is not stored in the first cache, a state of a control flag for a corresponding sub-line based on a virtual address of the requested data and a physical address corresponding to the virtual address, and a control unit that writes back the corresponding sub-line to the first cache based on the state of the control flag.

According to another aspect of the present invention, a cache-memory control method for controlling a first cache and a second cache having a cache line that is divided into a plurality of sub-lines each for storing data from the first cache, includes adding a control flag to each of the sub-lines, receiving a request for data, switching, when requested data is not stored in the first cache, a state of a control flag for a corresponding sub-line based on a virtual address of the requested data and a physical address corresponding to the virtual address, and writing back the corresponding sub-line to the first cache based on the state of the control flag.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of contents of an L1-cache;

FIG. 4 is an example of contents of a TLB;

FIG. 5 is an example of contents of an L2-cache;

FIGS. 12 and 13 are diagrams of examples of the virtual address and the physical address;

FIG. 24 is a diagram for explaining a virtual address and a physical address according to a conventional technology;

FIG. 25 is a diagram for explaining a data structure of an L2 cache according to the conventional technology; and FIGS. 26 to 30 are diagrams for explaining a method of controlling a cache memory according to the conventional technology.

DETAILED DESCRIPTION OF THE PREFERRED EMBODIMENTS

Exemplary embodiments of the present invention are described in detail below with reference to the accompanying drawings.

Figure 1:
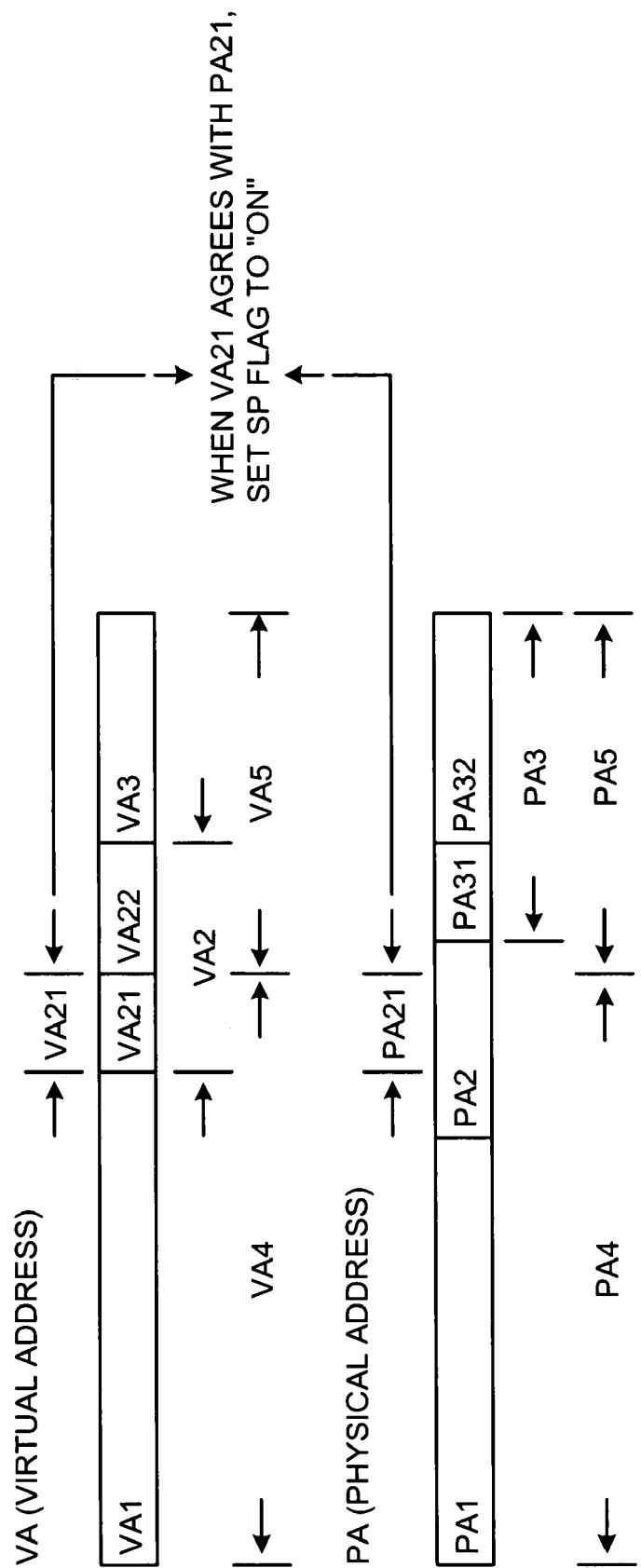
FIG. 1 is a diagram for explaining a virtual address and a physical address according to an embodiment of the present invention.

FIG. 1 is a diagram for explaining a virtual address and a physical address according to an embodiment of the present invention. VA is a virtual address, and PA is a physical address. VA1 and PA1 are bits higher than indices of the L1 cache and the L2 cache, respectively. VA2 and PA2 are the indices of the L1 cache and the L2 cache, respectively.

VA2 is divided into VA21 (a part that belongs to a virtual page number) and VA22 (a part that belongs to an offset in page). PA2 contains PA21, that is, a part that belongs to a physical page number in the L2 index. VA3 and PA3 are offsets in cache line of the L1 cache and the L2 cache, respectively. In the L2 cache, PA3 is divided into the sub-lines PA31 and PA32. PA31 is a sub-line number, and PA32 is an offset in sub-line.

VA4 and PA4 are a virtual page number and a physical page number, respectively. VA5 and PA5 are offsets in page. When virtual address VA is translated into physical address PA (or physical address PA is translated into virtual address VA), data (bits) stored in VA5 or PA5 is not transformed. In other words, data in VA5 and data in PA5 are identical.

An overview and features of a cache-memory control apparatus 100 according to the embodiment is described below. The cache-memory control apparatus 100 is configured to add a one-bit control flag corresponding to each of each of sub-lines in the L2 cache. The cache-memory control apparatus 100 determines whether VA21, or the part that belongs to the virtual page number in the L1 index, agrees with PA21, or the part that belongs to the physical page number in the L2 index, switches the control flag to either ON or OFF based on a result of the determination (see FIG. 1), and deletes only a specific sub-line that is necessary to delete from the L1 cache (i.e., writes back the specific sub-line from the L1 cache).

When VA21, or the part that belongs to the virtual page number in the L1 index, agrees with PA 21, or the part that belongs to the physical page number in the L2 index, it is possible to uniquely identify which L1 index the sub-line belongs to by using PA21 alone, i.e., not using VA21. It means that because the virtual address corresponds to the physical address, event when an access is issued directly using PA21, interference between sub-lines can not occur.

As described above, the cache-memory control apparatus 100 is configured to add the one-bit control flag to each of the sub-lines in the L2 cache, and deletes data from the L1 cache based on a status (ON or OFF) of the control flag. This makes it possible to avoid interference between sub-lines, that is, when data for the specific sub-line registered to the L1 index is deleted from the L1 cache, data for another sub-lines in an L2 cache line to which the specific sub-line belongs can not be deleted. Moreover, because the control flag that is added to each of the sub-lines requires only one bit, resource consumption by the control flag can be minimized. The control flag is referred to as an SP flag in following descriptions.

Figure 2:
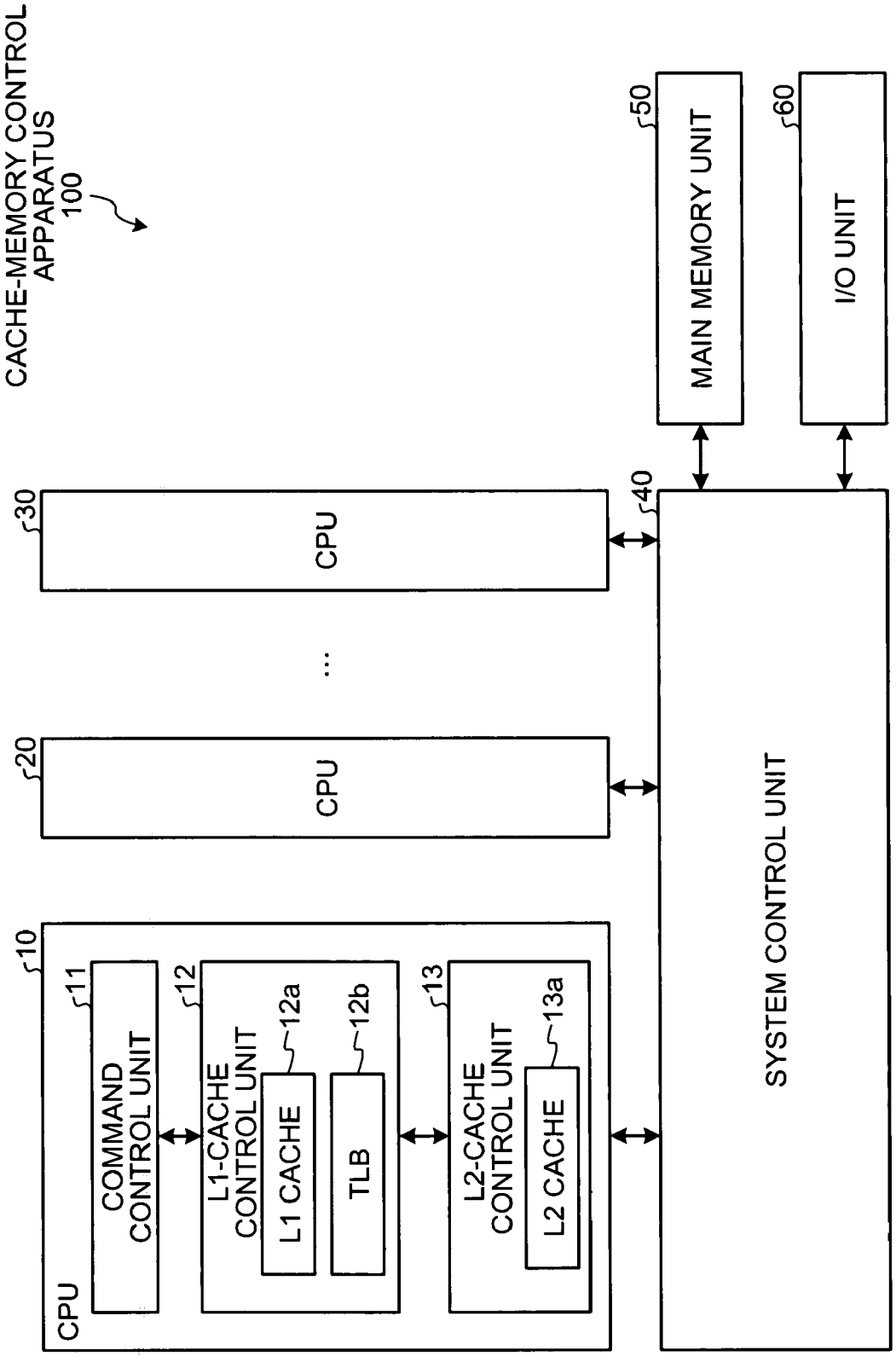
FIG. 2 is a functional block diagram of a cache-memory control apparatus according to an embodiment of the present invention.

FIG. 2 is a functional block diagram of the cache-memory control apparatus 100. The cache-memory control apparatus 100 includes central processing units (CPUs) 10 to 30, a system control unit 40, a main memory unit 50, and an input output (I/O) unit 60. Although three CPUs (10 to 30) are shown in FIG. 2, the number of CPUs is not limited to three. The CPUs 10 to 30 are of like structure and function, and thus but one of them, the CPU 10 is described in detail. The similar description for the CPUs 20 and 30 is not repeated.

The CPU 10 executes a computer program stored in the main memory unit 50. The CPU 10 receives data from an input device or a storage device (both not shown), computes or processes the data, and outputs the computed or processed data to an output device or the storage device (both not shown). The CPU 10 includes a command control unit 11, an L1-cache control unit 12, and an L2-cache control unit 13.

The command control unit 11 acquires data from the L1-cache control unit 12, computes or process the data, and outputs the computed or processed data to the L1-cache control unit 12. To acquire data from the L1-cache control unit 12, the command control unit 11 outputs a virtual address VA of data to be acquired (hereinafter, "access virtual address") to the L1-cache control unit 12.

The L1-cache control unit 12 includes an L1 cache 12a and a TLB 12b. Upon acquiring the access virtual address VA, the L1-cache control unit 12 outputs data corresponding to the access virtual address VA to the command control unit 11. The L1-cache control unit 12 acquires the corresponding data based on the L1 cache 12a and the TLB 12b, and outputs the acquired data to the command control unit 11. When the corresponding data is not in the L1 cache 12a, the L1-cache control unit 12 outputs an L2 cache-access address to the L2-cache control unit 13 to acquire the corresponding data. The L2 cache-access address contains a physical address corresponding to the access virtual address and VA21 (the part that belongs to the virtual page number) of the access virtual address.

FIG. 3 is an example of contents of the L1 cache 12a. FIG. 4 is an example of contents of the TLB 12b. As shown in FIG. 3, the L1 cache 12a contains information such as L1 index (corresponding to VA2), physical page number (PA4), and data corresponding to the L1 index or the physical page number. As shown in FIG. 4, the TLB 12b contains information such as virtual page number (VA4) and physical page number (PA4).

The L2-cache control unit 13 includes an L2 cache 13a. Upon acquiring the L2 cache-access address from the L1-cache control unit 12, the L2-cache control unit 13 outputs data corresponding to the L2 cache-access address to the L1-cache control unit 12.

FIG. 5 is an example of contents of the L2 cache 13a. The L2 cache 13a contains information such as L2 index (corresponding to PA2 shown in FIG. 1), registered physical address (corresponding to PA1 shown in FIG. 1), registered virtual index address (corresponding to VA21 shown in FIG. 1), sub-line n status for storing data on status of sub-line n (n is zero or a positive integer), special (SP) flag n corresponding to the above-described control flag (n is zero or a positive integer), and sub-line n data for storing cache data corresponding to the sub-line n status (n is zero or a positive integer).

Upon acquiring the L2 cache-access address from the L1-cache control unit 12, the L2-cache control unit 13 determines whether VA21 contained in the L2 cache-access address agrees with PA21, and sets (switches) the SP flag of the sub-line to ON (1) or OFF (0) based on a result of the determination.

The L2-cache control unit 13 re-registers data stored in the L2 cache 13a based on the status of the SP flag, and outputs data in the sub-line corresponding to the L2 cache-access address to the L1-cache control unit 12. Detailed descriptions with regard to the L1-cache control unit 12 and the L2-cache control unit 13 are described later.

The system control unit 40 stores therein a copy of an L2 cache tag. Upon acquiring a data request from the L2-cache control unit 13, the system control unit 40 acquires data corresponding to the request from the main memory unit 50, and outputs the acquired data to the L2-cache control unit 13. The system control unit 40 stores the L2 index, the registered physical address, and the sub-line n status, all shown in FIG. 5, as the copy of the L2 cache tag.

The main memory unit 50 stores therein data or commands used by the CPUs 10 to 30. In response to a data request from the system control unit 40, the main memory unit 50 outputs data corresponding to the request to the system control unit 40. The I/O unit 60 controls an input or an output from or to the storage device, the input device, and the output device (all not shown).

FIGS. 6 to 11 are diagrams for explaining processes performed by the L1-cache control unit 12 and the L2-cache control unit 13.

Figure 6:
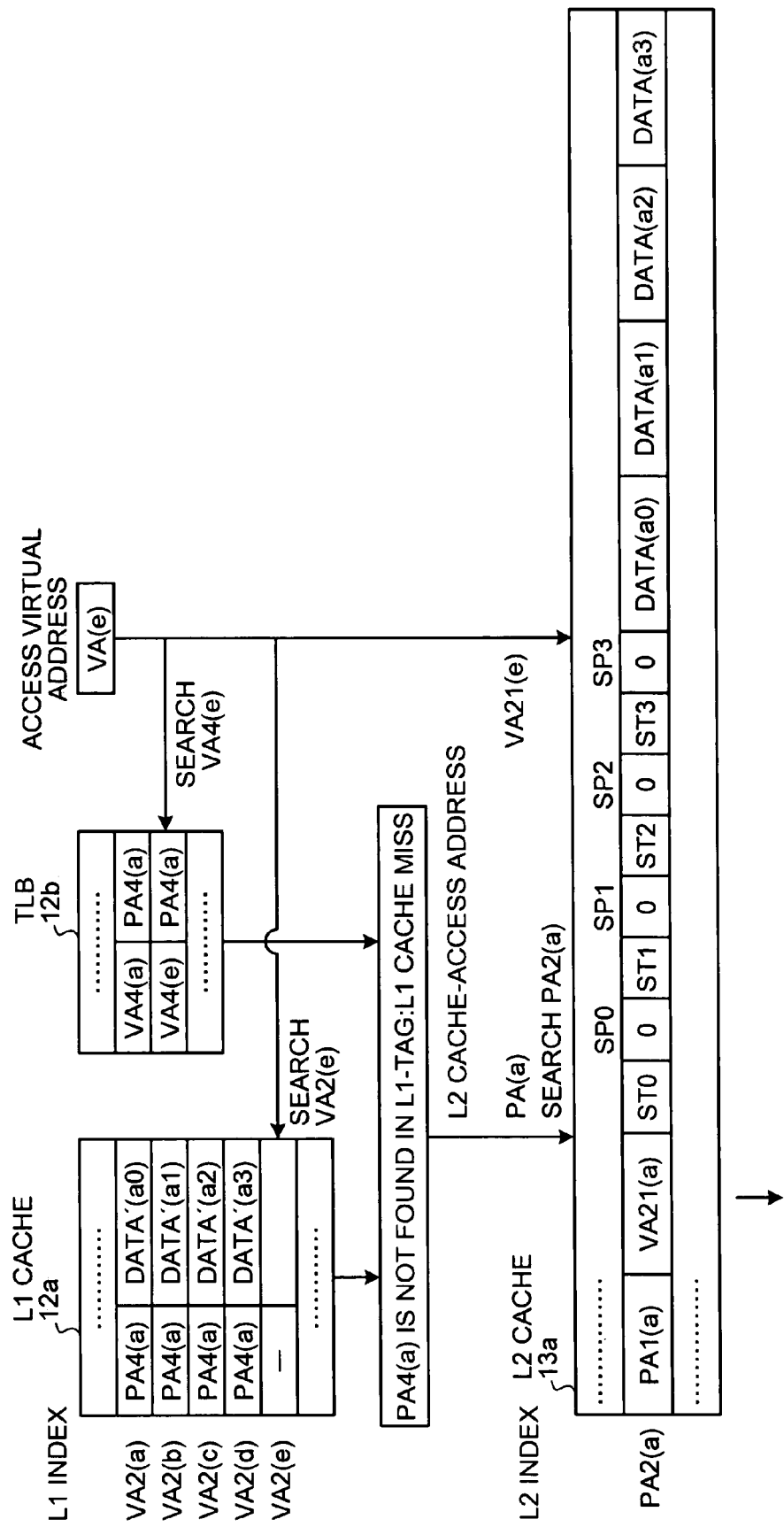
FIGS. 6 to 11 are diagrams for explaining a process performed by an L1-cache control unit and an L2-cache control unit shown in FIG. 2.

A first case is described with reference to FIGS. 6 and 7. In the first case, where the L1 cache 12a and the L2 cache 13a stores data as shown in FIG. 6, the L1-cache control unit 12 acquires an access virtual address VA(e) from the command control unit 11. VA(e) is registered to the TLB 12b as a physical page number PA4(a) that is also related to VA(a), an offset in page for the access virtual address VA(e) is sub-line 3 in the L2 cache, and PA21(a) agrees with VA21(e).

The virtual page number of VA(a), VA(b), VA(c), and VA(d) agrees with VA4(a). Therefore, part that belongs to the virtual page number in VA2(a), VA2(b), VA2(c), and VA2(d) agrees with VA21(a).

As shown in FIG. 6, upon acquiring the access virtual address VA(e) from the command control unit 11, the L1-cache control unit 12 translates VA(e) to the physical page number PA4(a) by referring to the TLB 12b. Because the physical page number PA4 corresponding to an L1 index of VA2(e) is not in the L1 cache 12a, the L1-cache control unit 12 determines an L1 cache miss.

When determining the L1 cache miss, the L1-cache control unit 12 outputs an L2 cache-access address to the L2-cache control unit 13. Upon acquiring the L2 cache-access address, the L2-cache control unit 13 compares VA21(e) contained in the L2 cache-access address with a registered virtual index address VA21 contained in the L2 cache 13a, and determines whether VA21(e) agrees with VA21. In the first case, VA21 agrees with VA21(a), so that both addresses do not agree. As a result, all sub-line data corresponding to PA4(a) registered to the L1 index becomes candidates for a write back.

The L2-cache control unit 13 compares PA21(a) with VA21(e) to determine whether PA21(a) agrees with VA21(e). In the first case, PA21(a) agrees with VA21(e), so that the L2-cache control unit 13 writes back data for sub-line 3 (i.e., DATA(a3)) alone. More particularly, the L1-cache control unit 12 once deletes data corresponding to the sub-line 3 from the L1 cache 12a. When DATA(a3) is updated in the L1 cache 12a (i.e., DATA(a3) is updated to DATA'(a3)), the latest data is written back to the L2 cache 13a.

Figure 7:
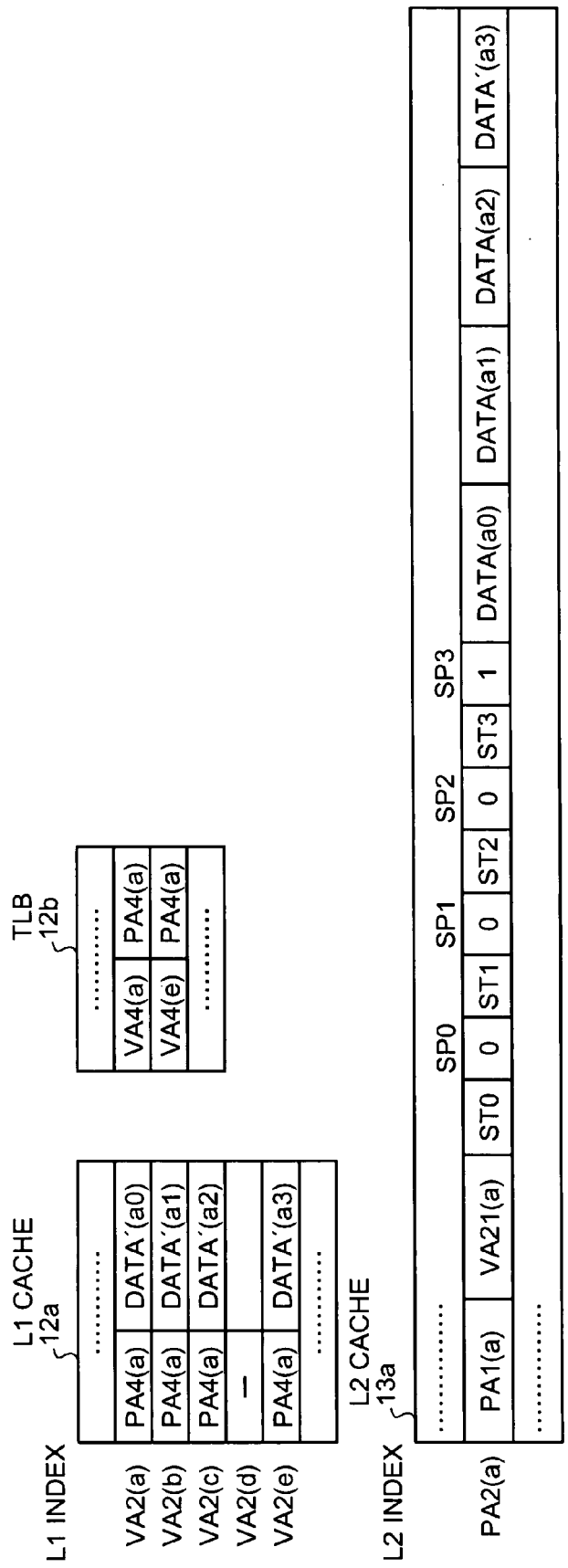

The L2-cache control unit 13 sets SP flag 3 to one (ON), and outputs DATA'(a3) to the L1-cache control unit 12 (see FIG. 7). In the first case, the registered virtual index of VA21 is unchanged (i.e., VA21(a)), and DATA'(a3) is stored in a line corresponding to the L1 index of VA2(e) in the L1 cache 12a.

Figure 8:
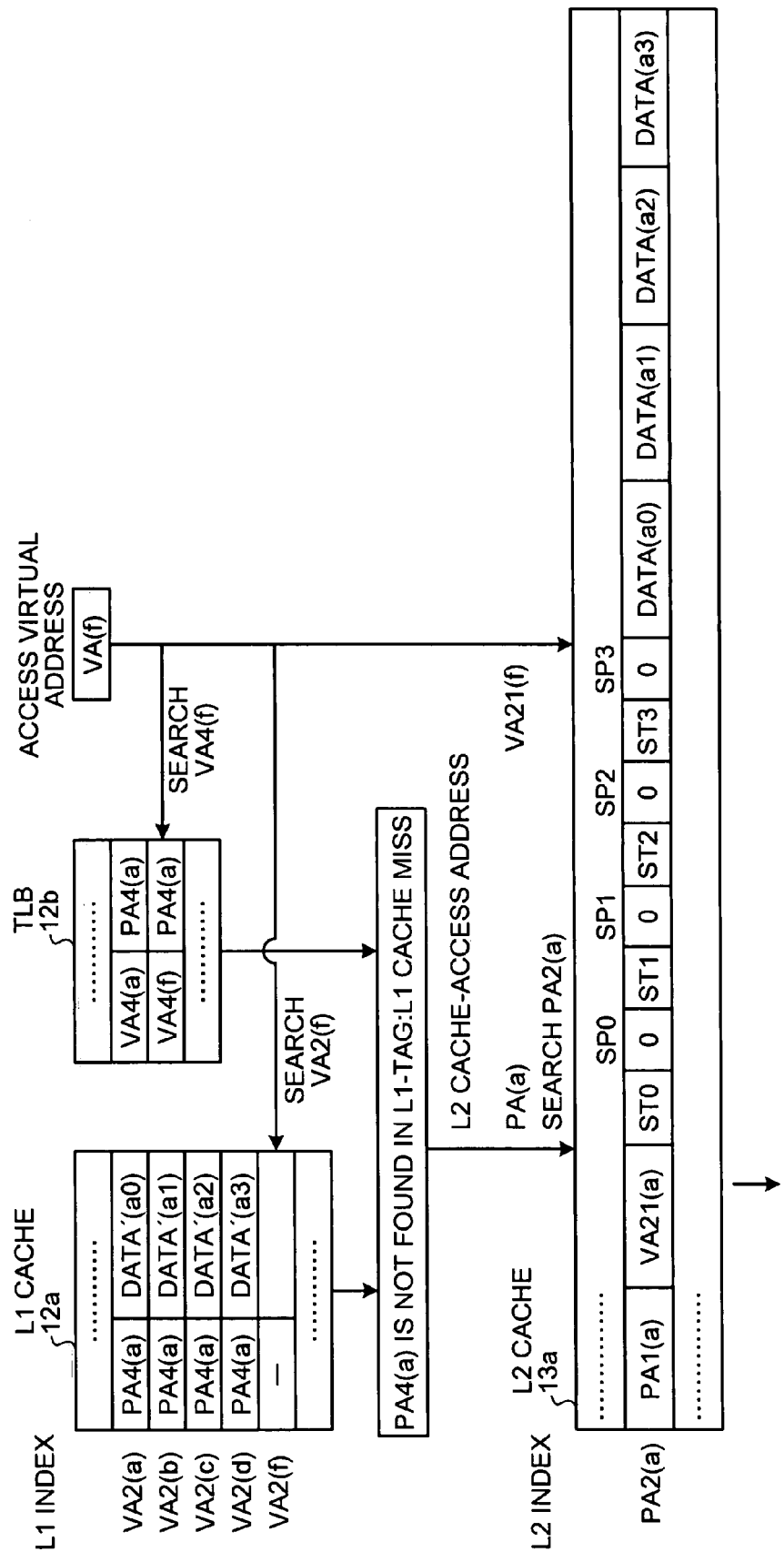

A second case is described with reference to FIGS. 8 and 9. In the second case, where the L1 cache 12a and the L2 cache 13a stores data as shown in FIG. 8, the L1-cache control unit 12 acquires an access virtual address VA(f) from the command control unit 11. VA(f) is registered to the TLB 12b as a physical page number PA4(a) that is also related to VA(a), an offset in page for VA(f) is sub-line 3 in the L2 cache, and PA21(a) does not agree with VA21(f).

The virtual page number of VA(a), VA(b), VA(c), and VA(d) agrees with VA4(a). Therefore, part that belongs to the virtual page number in VA2(a), VA2(b), VA2(c), and VA2(d) agrees with VA21(a).

As shown in FIG. 8, upon acquiring the access virtual address VA(f) from the command control unit 11, the L1-cache control unit 12 translate VA(f) to the physical address number PA4(a) by referring to the TLB 12b. Because the physical page number PA4 corresponding to an L1 index of VA2(f) is not in the L1 cache 12a, the L1-cache control unit 12 determines an L1 cache miss.

When determining the L1 cache miss, the L1-cache control unit 12 outputs an L2 cache-access address to the L2-cache control unit 13. Upon acquiring the L2 cache-access address, the L2-cache control unit 13 compares VA21(f) contained in the L2 cache-access address with the registered virtual index address VA21 contained in the L2 cache 13a, and determines whether VA21(f) agrees with VA21. In the second case, VA21 agrees with VA21(a), so that both addresses do not agree. As a result, all sub-line data corresponding to PA4(a) registered to the L1 index becomes candidates for a write back.

The L2-cache control unit 13 compares PA21(a) with VA21(f) to determine whether PA21(a) agrees with VA21(f). In the second case, PA21(a) does not agree with VA21(f), so that the L2-cache control unit 13 writes back all sub-line data corresponding to PA4(a) registered to the L1 index. When DATA(ax) is updated in the L1 cache 12a (i.e., DATA(ax) is updated to DATA'(ax)), the latest data is written back to the L2 cache 13a.

Figure 9:
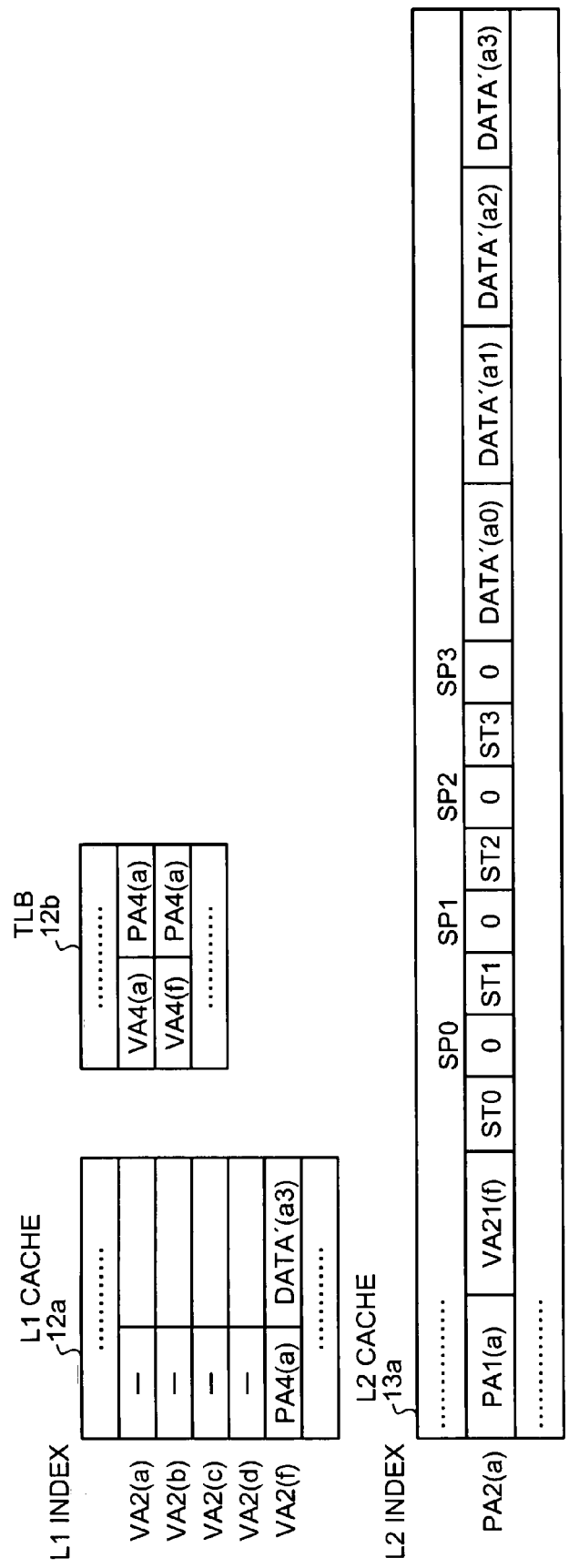

The L2-cache control unit 13 sets SP flag 3 to zero (OFF), and outputs DATA'(a3) to the L1-cache control unit 12 (see FIG. 9). In the second case, the registered virtual index of VA21 is changed to VA21(f) in the L2 cache 13a. DATA'(a3) is stored in a line corresponding to the L1 index of VA2(f) in the L1 cache 12a.

Figure 10:
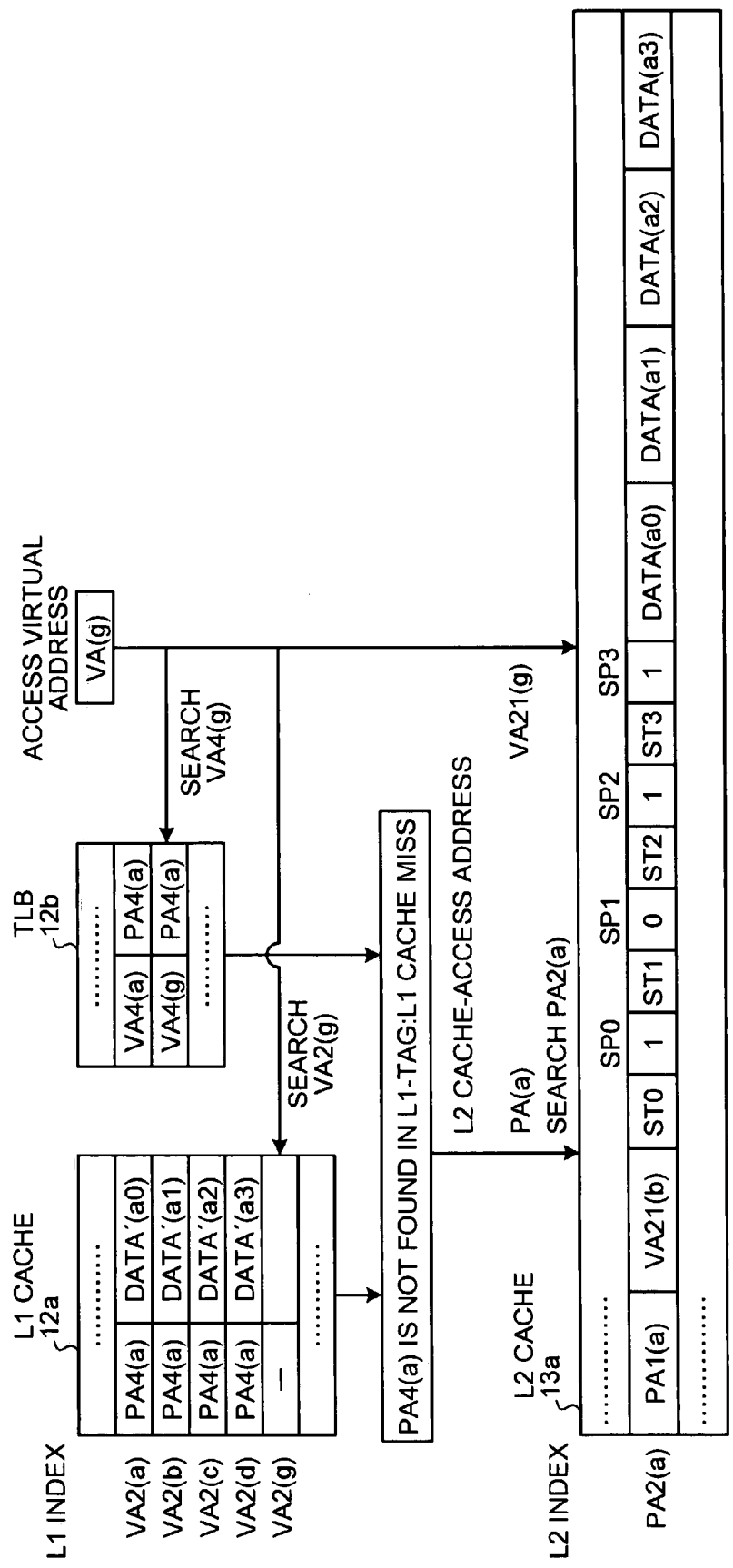
Figure 11:
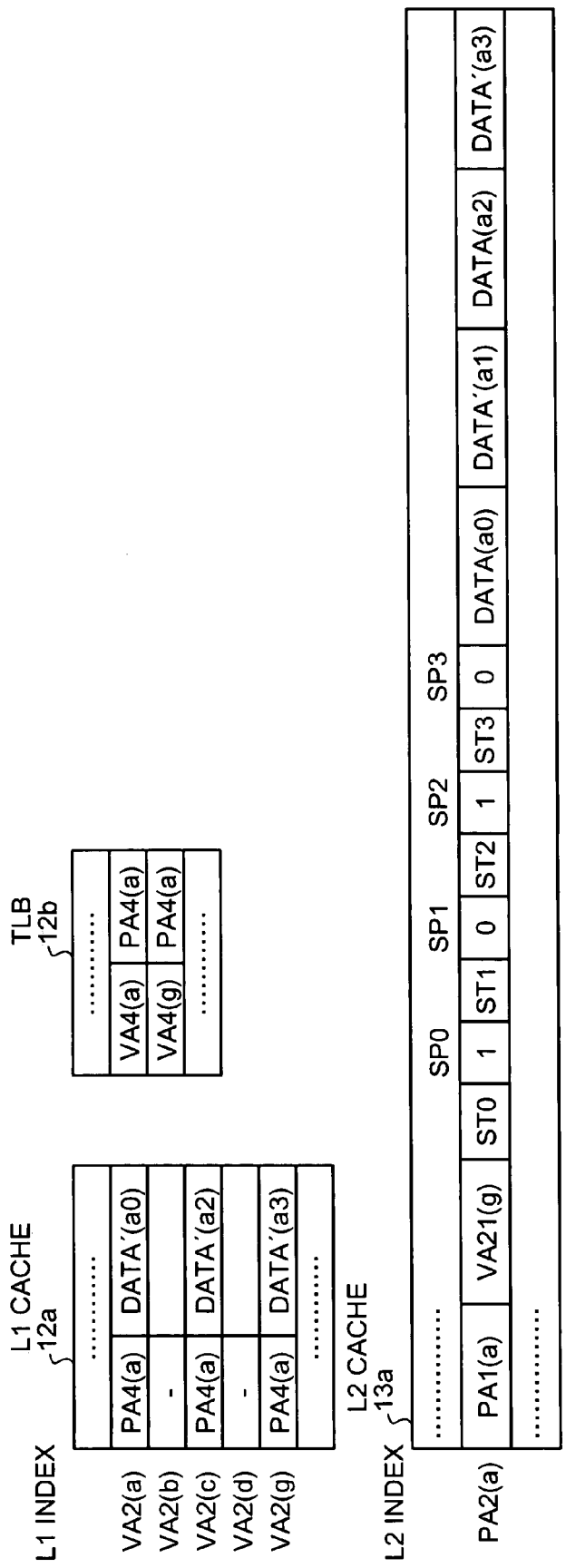

A third case is described with reference to FIGS. 10 and 11. In the third case, where the L1 cache 12a and the L2 cache 13a stores data as shown in FIG. 10, the L1-cache control unit 12 acquires an access virtual address VA(g) from the command control unit 11. VA(g) is registered to the TLB 12b as a physical page number PA4(a) that is also related to VA(a), an offset in page for VA(g) is sub-line 3 in the L2 cache, and PA21(a) does not agree with VA21(g).

The parts that belong to the virtual page numbers in VA2(a), VA2(b), VA2(c), and VA2(d) agree with PA21(a), VA21(b), PA21(a), and PA21(a), respectively. Therefore, SP flag 0, SP flag 2, and SP flag 3 are set to 1 in the L2 cache 13a shown in FIG. 10.

As shown in FIG. 10, upon acquiring the access virtual address VA(g) from the command control unit 11, the L1-cache control unit 12 translates VA(g) to the physical address PA4(a) by referring to the TLB 12b. Because the physical page number PA4 corresponding to an L1 index of VA2(g) is not in the L1 cache 12a, the L1-cache control unit 12 determines an L1 cache miss.

When determining the L1 cache miss, the L1-cache control unit 12 outputs an L2 cache-access address to the L2-cache control unit 13. Upon acquiring the L2 cache-access address, the L2-cache control unit 13 compares VA21(g) contained in the L2 cache-access address with a registered virtual index address VA21 contained in the L2 cache 13a, and determines whether VA21(g) agrees with VA21. In the third case, VA21 agrees with VA21(b), so that both addresses do not agree. As a result, all sub-line data corresponding to PA4(a) that is registered to the L1 index becomes candidates for a write back.

The L2-cache control unit 13 compares PA21(a) with VA21(g) to determine whether PA21(a) agrees with VA21(g). In the third case, PA21(a) does not agree with VA21(g), so that the L2-cache control unit 13 sets the registered virtual index address to VA21(g) (see FIG. 11).

The L1-cache control unit 12 once deletes the sub-lines corresponding to PA4(a) registered to the L1 index from the L1 cache 12a. A sub-line the SP flag of which is one (ON) can be excluded from candidates for a write back, because it is determined that VA21 agrees with PA21(a) in such a sub-line. More particularly, DATA'(a0) and DATA'(a2) are excluded from the candidates for the write back. DATA'(a3) is not excluded, because DATA'(a3) is in the sub-line that belongs to the access virtual address VA(g). When DATA(ax) is updated in the L1 cache 12a (i.e., DATA(ax) is updated to DATA'(ax)), the latest data is written back to the L2 cache 13a.

The L2-cache control unit 13 sets SP flag 3 to zero (OFF), and outputs DATA'(a3) to the L1-cache control unit 12. In the third case, DATA'(a3) is stored in a line corresponding to the L1 index of VA2(g) in the L1 cache 12a.

A detailed description is made more specifically. Although both the L1 cache 12a and the L2 cache 13a are assumed to be direct mapped caches to make the description simpler, the L1 cache 12a and the L2 cache 13a can be set-associative caches. The L1 cache 12a is 64 kilo bytes, the L2 cache 13a is 1024 kilo bytes. Line sizes of the L1 cache 12a and the L2 cache 13a are 64 bytes and 256 bytes, respectively.

Although the line size of the L2 cache 13a is 256 kilo bytes, the line of the L2 cache 13a can be managed by each sub-line with 64 bytes, as much as the line size of the L1 cache 12a. A page size is 4 kilo bytes, and both the L1 cache 12a and the L2 cache 13a are write-back caches.

Figure 13:
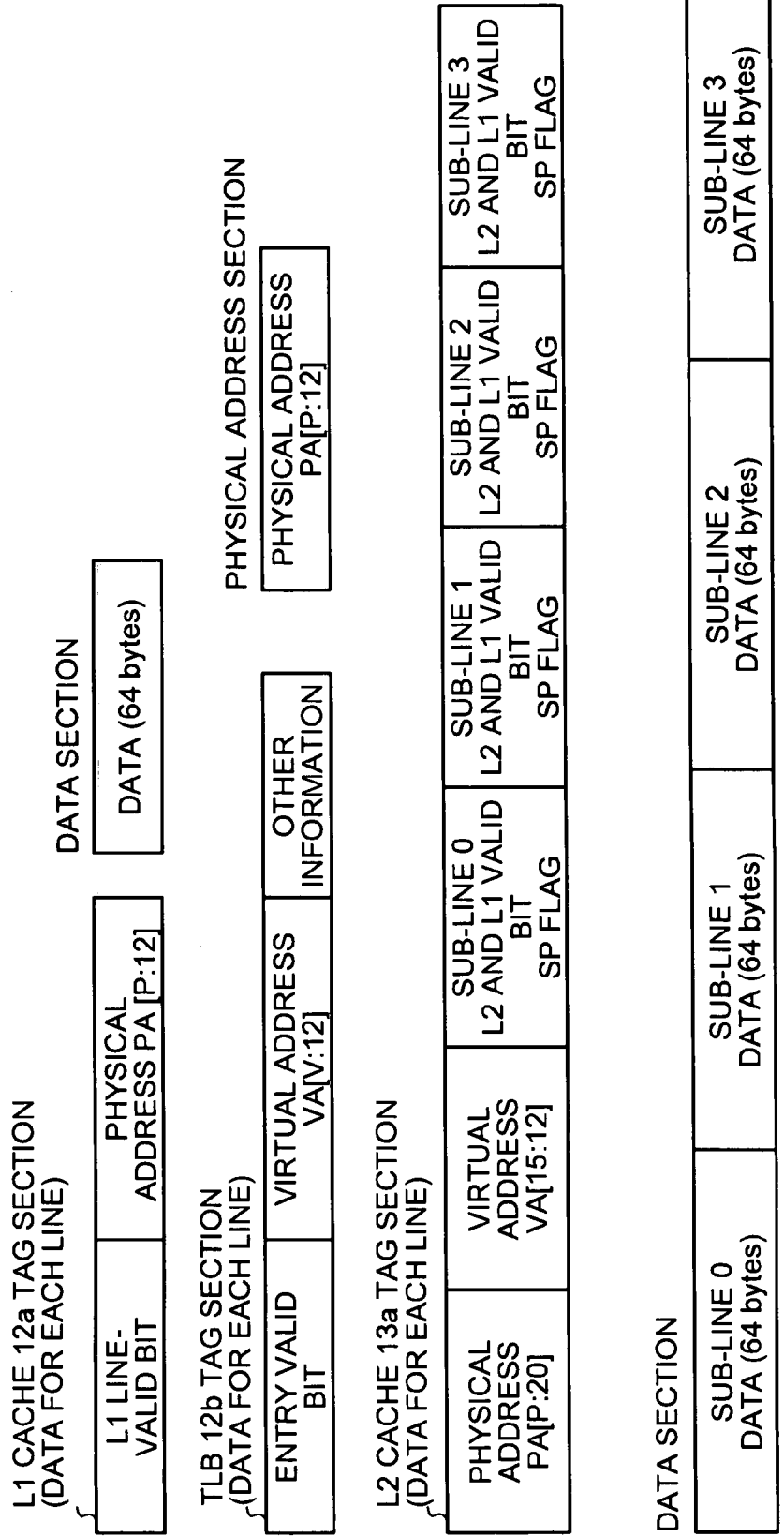

FIGS. 12 and 13 are diagrams of examples of the virtual address and the physical address. In FIG. 12, V is a supportable highest-ordered bit of the virtual address, and P is a supportable highest-ordered bit of the physical address. VA1 and PA1 are bits higher than indices of the L1 cache 12a and the L2 cache 13a, respectively.

VA1=VA[V:16]
PA1=PA[P:20]

VA2 and PA2 are indices of the L1 cache 12a and the L2 cache 13a, respectively.

VA2=VA[15:6]
PA2=PA[19:8]

VA2 can be divided into VA21 (the part that belongs to the virtual page number) and VA22 (the part that belongs to the offset in page).

VA21=VA[15:12]
VA22=VA[11:6]

VA3 and PA3 are the offsets in cache line of the L1 cache 12a and the L2 cache 13a, respectively.

VA3=VA[5:0]
PA3=PA[7:0]

In the L2 cache, PA3 is divided into the sub-lines PA31 and PA32. PA31 is the sub-line number, and PA32 is the offset in sub-line.

PA31=PA[7:6]
PA32=PA[5:0]

VA4 and PA4 are the virtual page number and the physical page number, respectively.

VA4=VA[V:12]
PA4=PA[P:12]

VA5 and PA5 are the offsets in page (VA5 agrees with PA5).

VA5=VA[11:0]
PA5=PA[11:0]
VA5=PA5

As shown in FIG. 13, the L1 cache 12a has a tag section (hereinafter, "L1 cache tag") and a data section (hereinafter, "L1-cache data section"). The L1 cache tag contains a valid bit that indicates validity of the line and a registered physical address PA4=PA[P:12]. The L1-cache data section contains data (64 bytes) on the line.

The TLB 12b has a tag section and a physical address section. The tag section contains an entry valid bit, a virtual address VA[V:12], and other information (such as a process ID). The physical address section contains a physical address PA[P:12].

The L2 cache 13a has a tag section (hereinafter, "L2 cache tag") and a data section (hereinafter, "L2-cache data section"). The L2 cache tag contains a physical address PA1=PA[P:20] and a virtual address VA21=VA[15:12], and valid bits (an L2 valid bit (L2 V) and an L1 valid bit (L1V)) and an SP flag for each sub-line. The L2 valid bit and the L1 valid bit indicate validity of the sub-line in the L2 cache 13a and the L1 cache 12a, respectively. When VA21=VA[15:12] agrees with PA21=PA[15:12], the SP flag is set to one (ON). In the L2 cache data section, data (64 bytes) is stored in each sub-line.

FIGS. 14 to 19 are diagrams for explaining the processes performed by the L1-cache control unit 12 and the L2-cache control unit 13 in detail.

Figure 14:
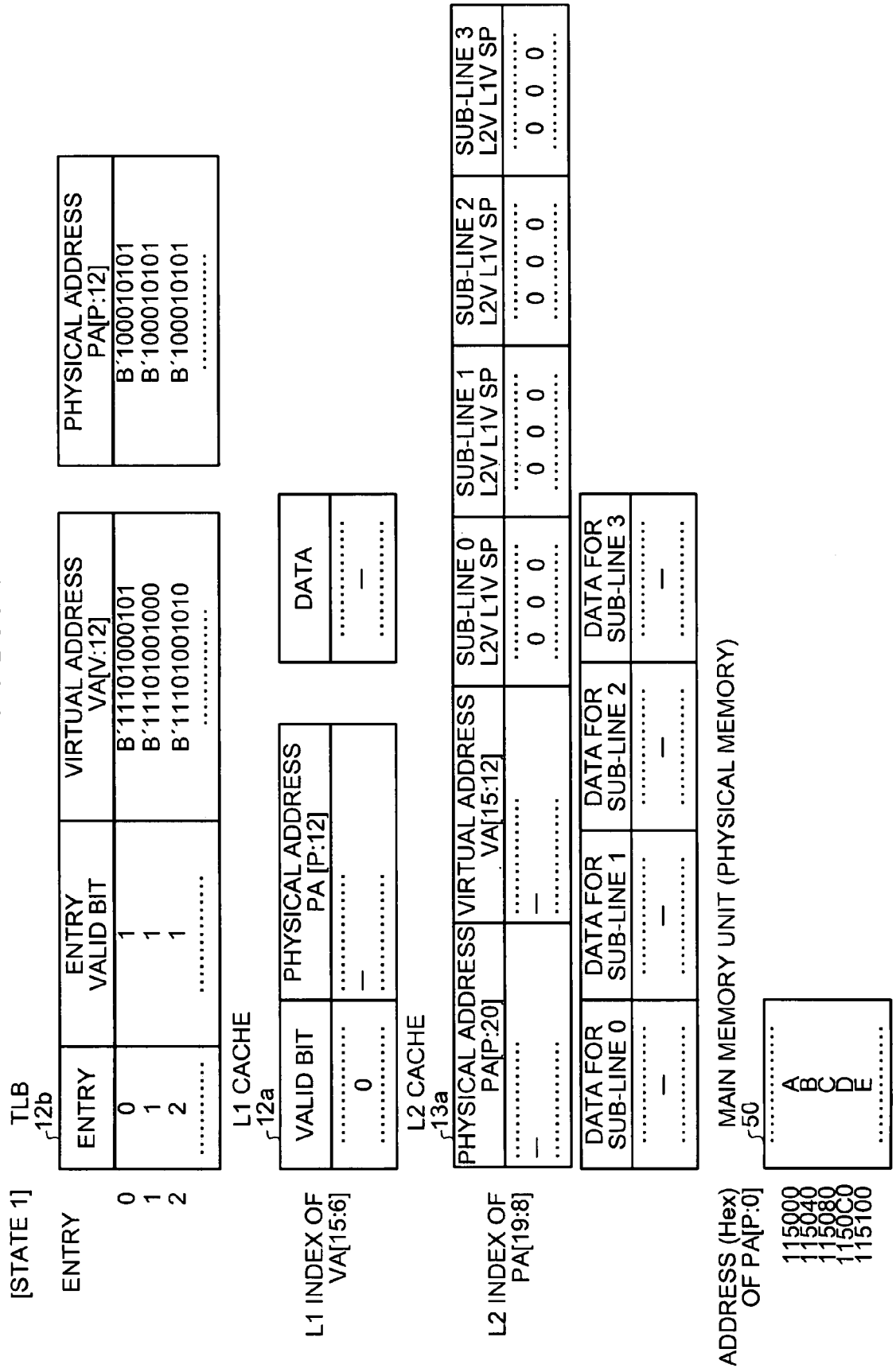
FIGS. 14 to 19 are diagrams :for explaining a process performed by the L1-cache control unit and the L2-cache control unit in detail.

An example is assumed, in which the L1 cache 12a and the L2 cache 13a are in a state as shown in FIG. 14 (state 1). The TLB 12b contains the virtual page number of VA[V:12] and the physical page number of PA[P:12], both related to each other (the other information is omitted for convenience of explanation). An address used for an access to be issued is not registered to the L1 cache 12a and the L2 cache 13a. The main memory unit 50 stores therein A, B, . . . by 64-byte boundary unit from H'115000, in which H (hex) represents a hexadecimal digit. In other words, H'115000 is equal to B'000100010101000000000000 represented as a binary number, in which B (bit) represents a binary digit.

Under state 1, upon receiving a request for data with an access virtual address VA[V:0]=H'745000 from the command control unit 11, the L1-cache control unit 12 refers to the L1 cache tag and the TLB 12b. The valid bit is OFF in an L1 index of VA[15:6]=B'101000000, so that it is determined that the requested data is not registered to the L1 cache 12a.

A physical page corresponding to the access virtual address is PA[P:12]=H'115 from the TLB 12b, so that the L1-cache control unit 12 outputs an L2 cache-access address PA[P:0]=H'115000 (VA[15:12]=H'5) to the L2-cache control unit 13 to request the L2-cache control unit 13 to send data corresponding to the L2 cache-access address.

In the process of retrieving data in the L2 cache tag by an L2 index of PA[19:8]=B'000101010000, it is found that the valid bit is OFF. Thus, the L2-cache control unit 13 determines that the requested data is not registered to the L2 cache 13a. The L2-cache control unit 13 sends a request for data on PA[P:0]=H'115000 to the main memory unit 50 (actually, the L2-cache control unit 13 accesses the main memory unit 50 via the system control unit 40. However, the system control unit 40 is omitted for convenience of explanation).

Upon receiving the response from the main memory unit 50, because VA[15:12]=H'5 agrees with PA[15:12]=H'5, the L2-cache control unit 13 sets an SP flag corresponding to the sub-line number (i.e., 0:PA[7:6]=H'5) to one (ON). Moreover, the L2-cache control unit 13 registers information to the L2 cache tag such as the physical address as PA[PA:20]=H'115, the virtual address as VA[15:12]=H'5, the L2 valid bit (L2V) as one (ON), and the L1 valid bit (L1V) as one (ON), and stores data A in the L2 cache data section. Still moreover, the L2-cache control unit 13 outputs data A to the L1-cache control unit 12.

Upon receiving the response from the L2-cache control unit 13, the L1-cache control unit 12 registers information to the L1 cache tag such as the physical address as PA[P:12]=H'115 and the L1 valid bit as one (ON), and stores data A in the L1 cache data section. Moreover, the L1-cache control unit 12 outputs data A to the command control unit 11.

Figure 15:
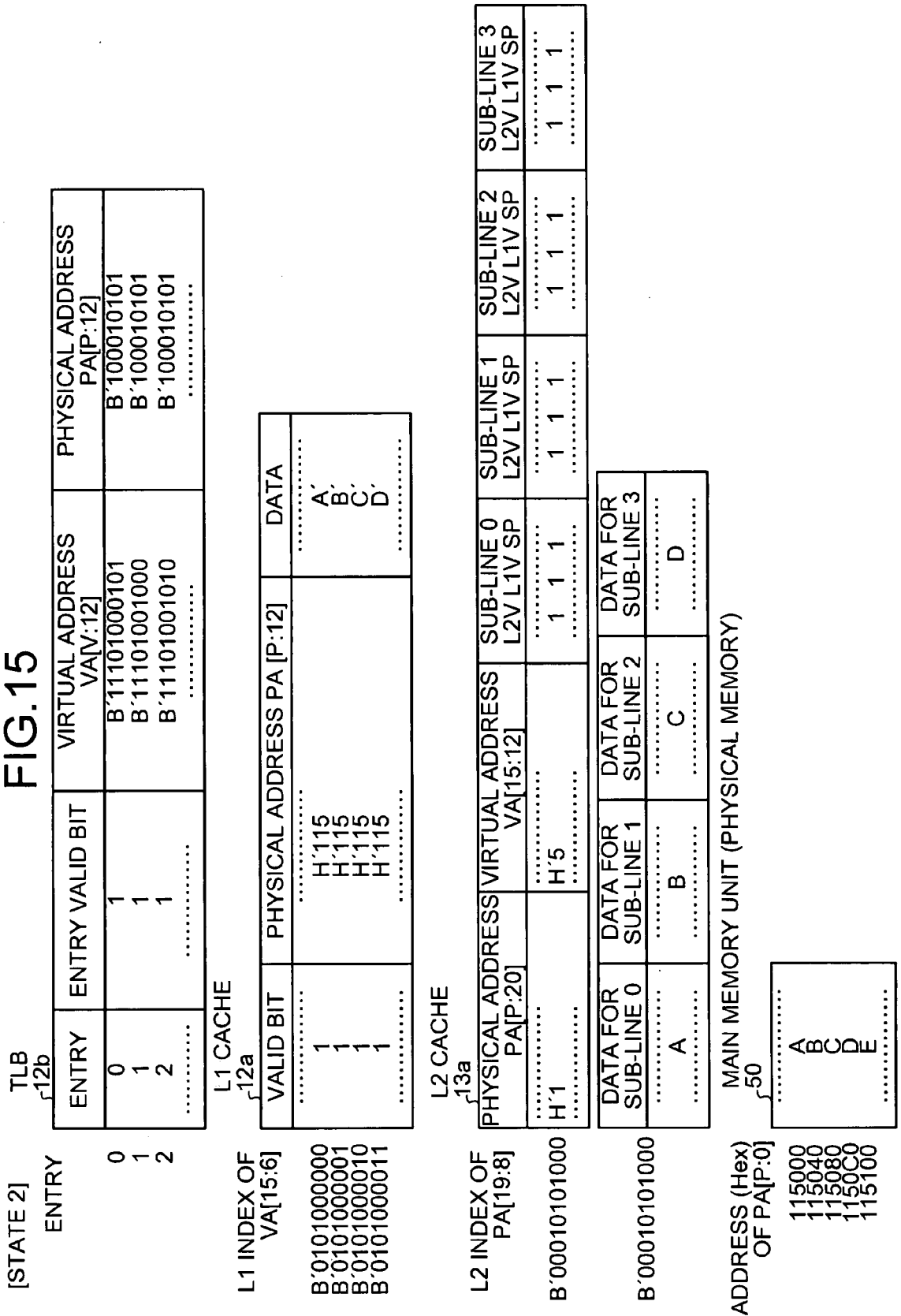

Subsequently, when the L1-cache control unit 12 and the L2-cache control unit 13 acquires three access virtual addresses of VA[V:0]=H'745040, VA[V:0]=H'745080, and VA[V:0]=H'7450C0 from the command control unit 11, and performs the similar processes for the three access virtual addresses, data B, C, and D, each corresponding to the three access virtual addresses, respectively, is stored in the L1 cache 12a as shown in FIG. 15. The state as shown in FIG. 15 is called as state 2.

Under state 2, upon receiving a request for data with the access virtual address VA[V:0]=H'748080 from the command control unit 11, the L1-cache control unit 12 tries to retrieve data in the L1 index with VA[15:6]=B'1000000010. The address is not in the L1 cache tag, so that the L1-cache control unit 12 outputs an L2 cache-access address PA[P:0]=H'115080 (VA[15:12]=H'8) to the L2-cache control unit 13 by using a physical page number of PA[P:12]=H'115 acquired from the TLB 12b to request the L2-cache control unit 13 to send data corresponding to the L2 cache-access address.

In the process of retrieving data in the L2 cache tag by the L2 index of PA[19:8]=B'000101010000, it is found that PA[P:20]=H'1 is registered and the L2 valid bit of a corresponding sub-line (in this example, sub-line 2, because of PA[6:7]=2) is one (ON). Thus, the L2-cache control unit 13 determines that the requested data is in the L2 cache 13a.

The SP flag of sub-line 2 is one (ON), so that the L2-cache control unit 13 compares requested VA[15:12]=H'8 with VA[15:12]=H'5 that is registered to the L2 cache tag. As a result of the comparison, it is determined that the requested VA[15:12]=H'8 does not agree with VA[15:12]=H'5 that is registered to the L2 cache tag.

Because all SP flags corresponding to sub-lines other than sub-line 2 in the L2 cache 13a are one (ON), the L1-cache control unit 12 deletes data corresponding to sub-line 2 from the L1 cache 12a, and writes back the data to the L2 cache 13a. Moreover, the L1-cache control unit 12 sets the valid bit corresponding to a line the data on which have been deleted from the L1 cache 12a to zero (OFF).

Figure 16:
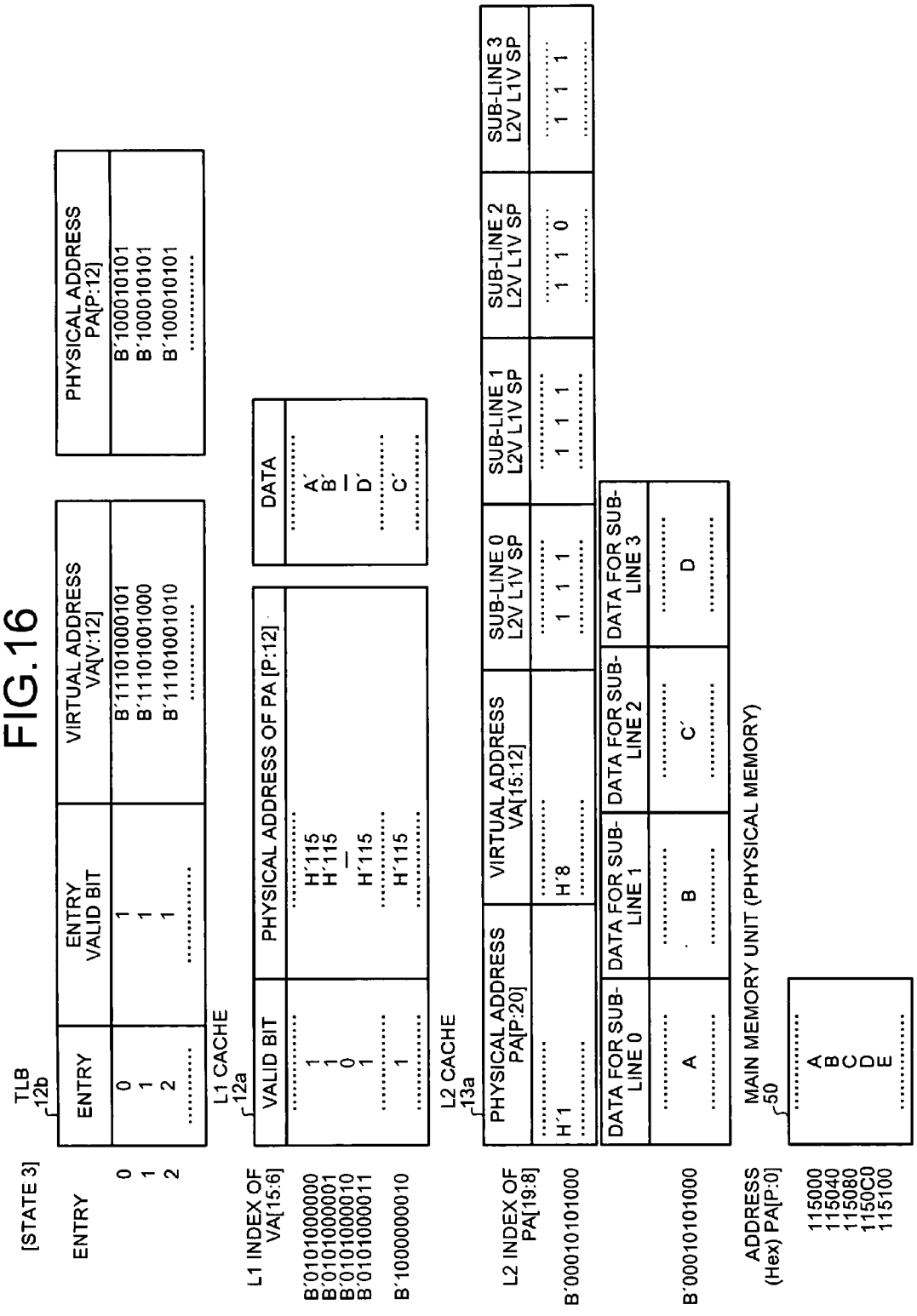

After the write back to the L2 cache 13a is completed, the L2-cache control unit 13 sets the SP flag of sub-line 2 to zero (OFF), re-registers the virtual address as VA[15:12]=H'8, and the L1 valid bit as one (ON), and sends data C' to the L1-cache control unit 12 as a response to the request. As a result, the L1 cache 12a and the L2 cache 13a are in state 3 as shown in FIG. 16.

Figure 17:
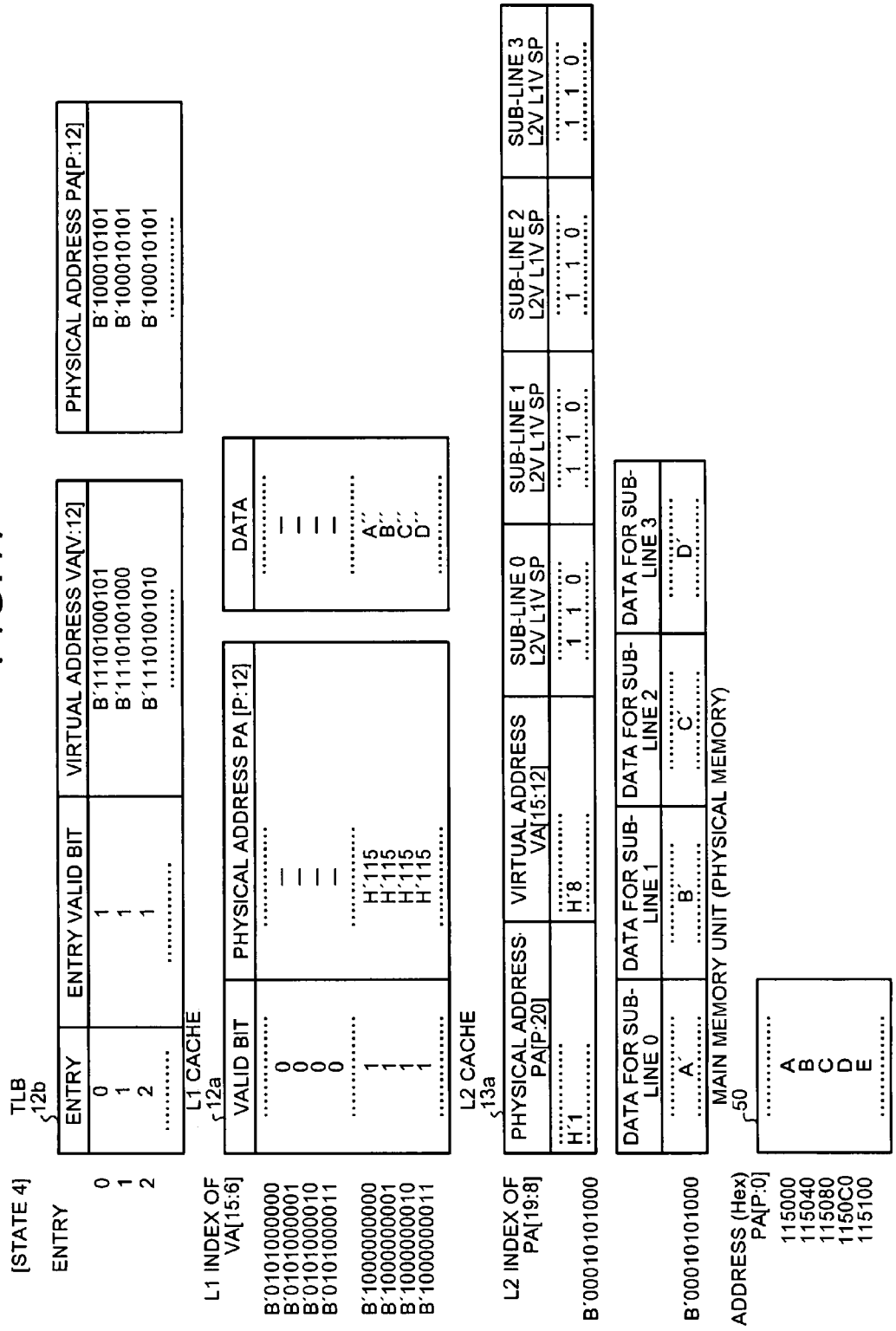

Subsequently, when the L1-cache control unit 12 and the L2-cache control unit 13 acquires access virtual addresses from the command control unit 11, and performs the similar processes for the above access virtual addresses, data A', B', and D', each corresponding to the above access virtual addresses, respectively, is registered. If all of data A' to D' including data C' is updated to data A", B", C", and D", respectively, data A", B", C", and D' are stored as shown in FIG. 17. The state as shown in FIG. 17 is called as state 4.

Under state 4, upon receiving a request for data with an access virtual address VA[V:0]=H'74A040 from the command control unit 11, the L1-cache control unit 12 tries to retrieve data in the L1 index with VA[15:6]=B'1010000001. The address is not in the L1 cache tag, so that the L1-cache control unit 12 outputs an L2 cache-access address PA[P:0]=H'115040 (VA[15:12]=H'A) to the L2-cache control unit 13 by using the physical page number of PA[P:12]=H'115 acquired from the TLB 12b to request the L2-cache control unit 13 to send data corresponding to the L2 cache-access address.

In the process of retrieving data in the L2 cache tag by the L2 index of PA[19:8]=B'000101010000, it is found that PA[P:20]=H'1 is registered and the L2 valid bit of a corresponding sub-line (in this example, sub-line 1, because of PA[6:7]=1) is one (ON). Thus, the L2-cache control unit 13 determines that the requested data is in the L2 cache 13a.

The SP flag of sub-line 1 is zero (OFF), so that the L2-cache control unit 13 compares the requested VA[15:12]=H'A with VA[15:12]=H'8 that is registered to the L2 cache tag. Because VA[15:12]=H'A does not agree with VA[15:12]=H'8, the L2-cache control unit 13 compares the requested VA[15:12]=H'A with PA[15:12]=H'8. However, VA[15:12]=H'A does not agree with PA[15:12]=H'8, so that the L1-cache control unit 12 deletes data for in both the requested sub-line, that is, sub-line 1, and any other sub-line having a corresponding SP flag indicating zero (OFF) (i.e., sub-lines 0, 2, and 3), from the L1 cache 12a, and writes back the data to the L2 cache 13a. Moreover, the L1-cache control unit 12 sets the valid bit corresponding to a line the data on which have been deleted from the L1 cache 12a to zero (OFF).

Figure 18:
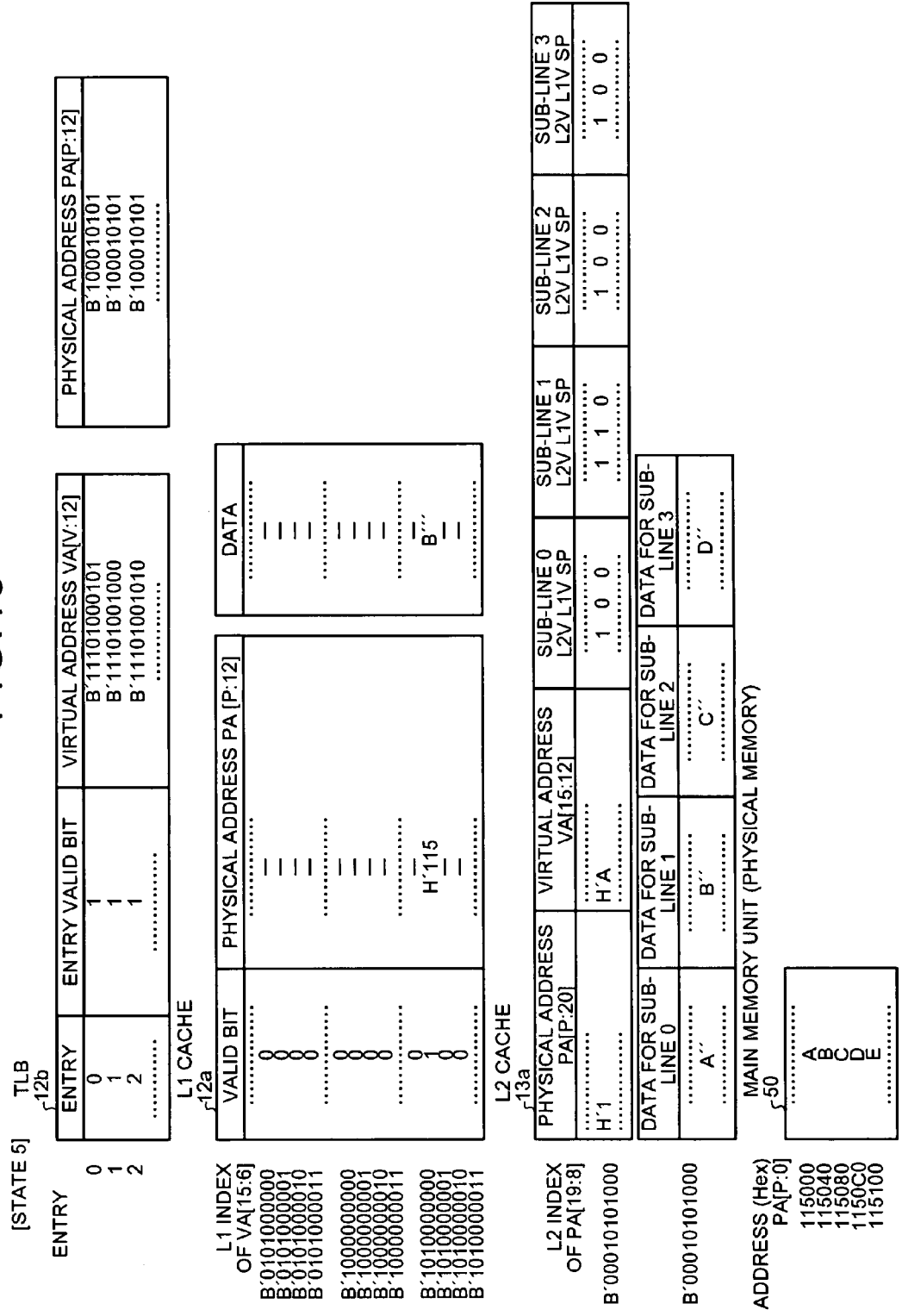
Figure 19:
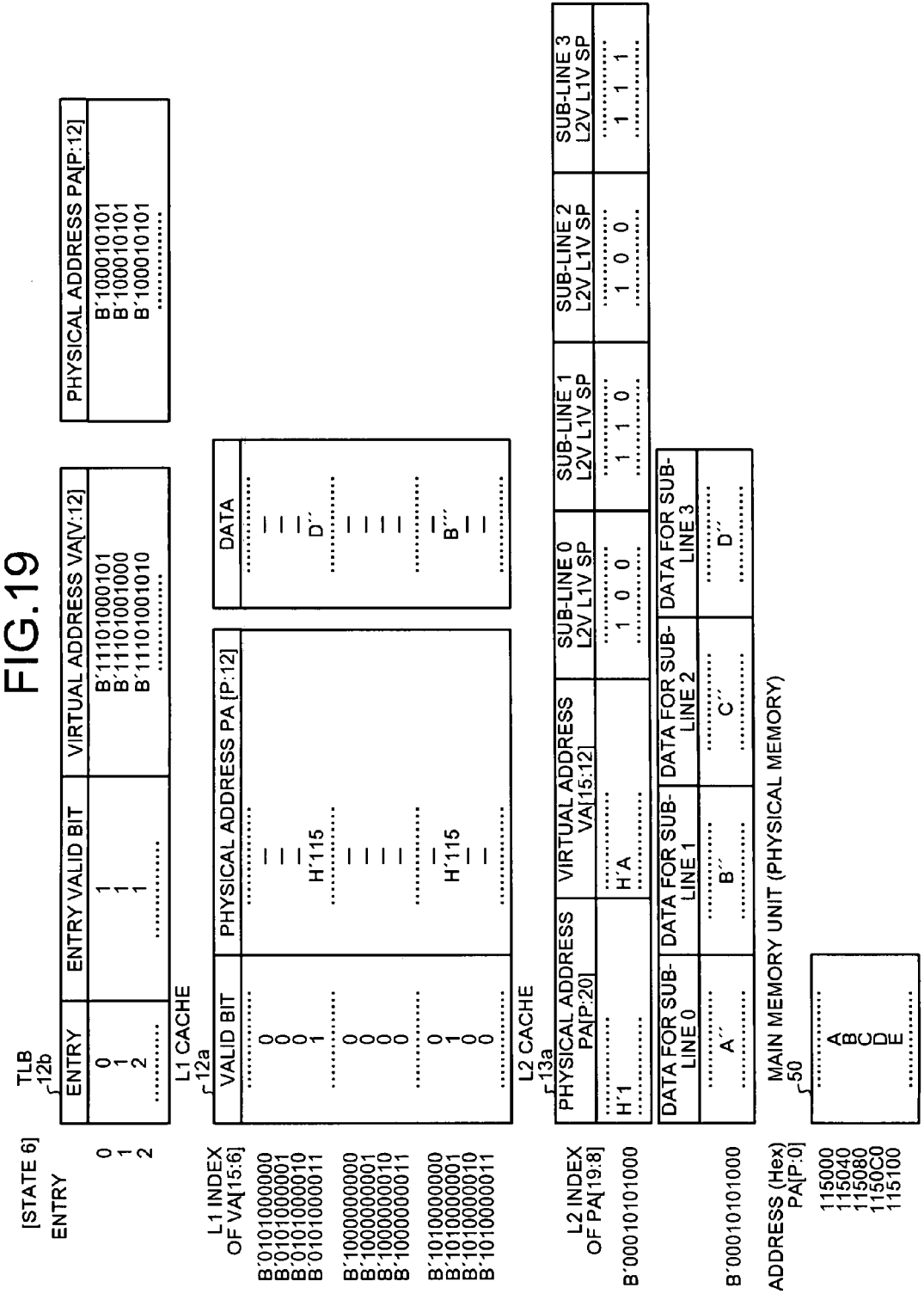

After the write back for all of the target sub-lines is completed, the L2-cache control unit 13 keeps the SP flag of sub-line 1 unchanged, i.e., zero (OFF), registers the virtual address as VA[15:12]=H'A and the L1 valid bit as one (ON), and sends data B" to the L1-cache control unit 12 as a response to the request. If data B" is updated to data B''', data B''' is stored. As a result, the L1 cache 12a and the L2 cache 13a are in state 5 as shown in FIG. 18.

Under state 5, upon receiving a request for data with an access virtual address VA[V:0]=H'7450C0 from the command control unit 11, the L1-cache control unit 12 tries to retrieve data in L1 index with VA[15:6]=B'0101000011. The valid bit of the L1 index of VA[15:6]=B'0101000011 is zero (OFF), so that the L1-cache control unit 12 determines that the requested data is not registered to the L1 cache 12a.

Because the physical page number acquired based on the access virtual address VA[V:0]=H'7450C0 and the TLB 12b is PA[P:12]=H'115, the L1-cache control unit 12 outputs an L2 cache-access address PA[P:0]=H'1150C0 (VA[15:12]=H'5) to the L2-cache control unit 13 to request the L2-cache control unit 13 to send data corresponding to the L2 cache-access address.

In the process of retrieving data in the L2 cache tag by the L2 index of PA[19:8]=B'000101010000, it is found that PA[P:20]=H'1 is registered and the L2 valid bit of a corresponding sub-line (in this example, sub-line 3, because of PA[6:7]=3) is one (ON). Thus, the L2-cache control unit 13 determines that the requested data is in the L2 cache 13a.

The SP flag of sub-line 3 is zero (OFF), so that the L2-cache control unit 13 compares the requested VA[15:12]=H'5 with VA[15:12]=H'A that is registered to the L2 cache tag. Because VA[15:12]=H'5 does not agree with VA[15:12]=H'A, the L2-cache control unit 13 compares the required VA[15:12]=H'5 with a physical address PA[15:12]=H'5. VA[15:12]=H'5 agrees with PA[15:12]=H'5, so that the L2-cache control unit 13 determines that a write back is performed for sub-line 3 alone.

Because the L1 valid bit of sub-line 3 registered to the L2 cache tag is zero, the L2-cache control unit 13 determines that data is not in sub-line 3 in the L1 cache 12a, so that L2-cache control unit 13 does not delete or write back the corresponding data from the L1 cache 12a. Moreover, the L2-cache control unit 13 sets the L1 valid bit and the SP flag of sub-line 3 in the L2 cache 13a to one, and outputs data D" to the L1-cache control unit 12. The L1-cache control unit 12 registers data D" to the L1 cache 12a (see FIG. 19).

As described above, the SP flag is added to each sub-line and an SP flag indicating one (ON) indicates that the virtual address corresponds to the physical address. The L2-cache control unit 13 writes back data based on the SP flag, which makes it possible to avoid interference between sub-lines having a common virtual address. Moreover, because the SP flag requires only one bit, it is possible to save a part of the resource compared with the method of adding a virtual address to each of the sub-lines.

Figure 20:
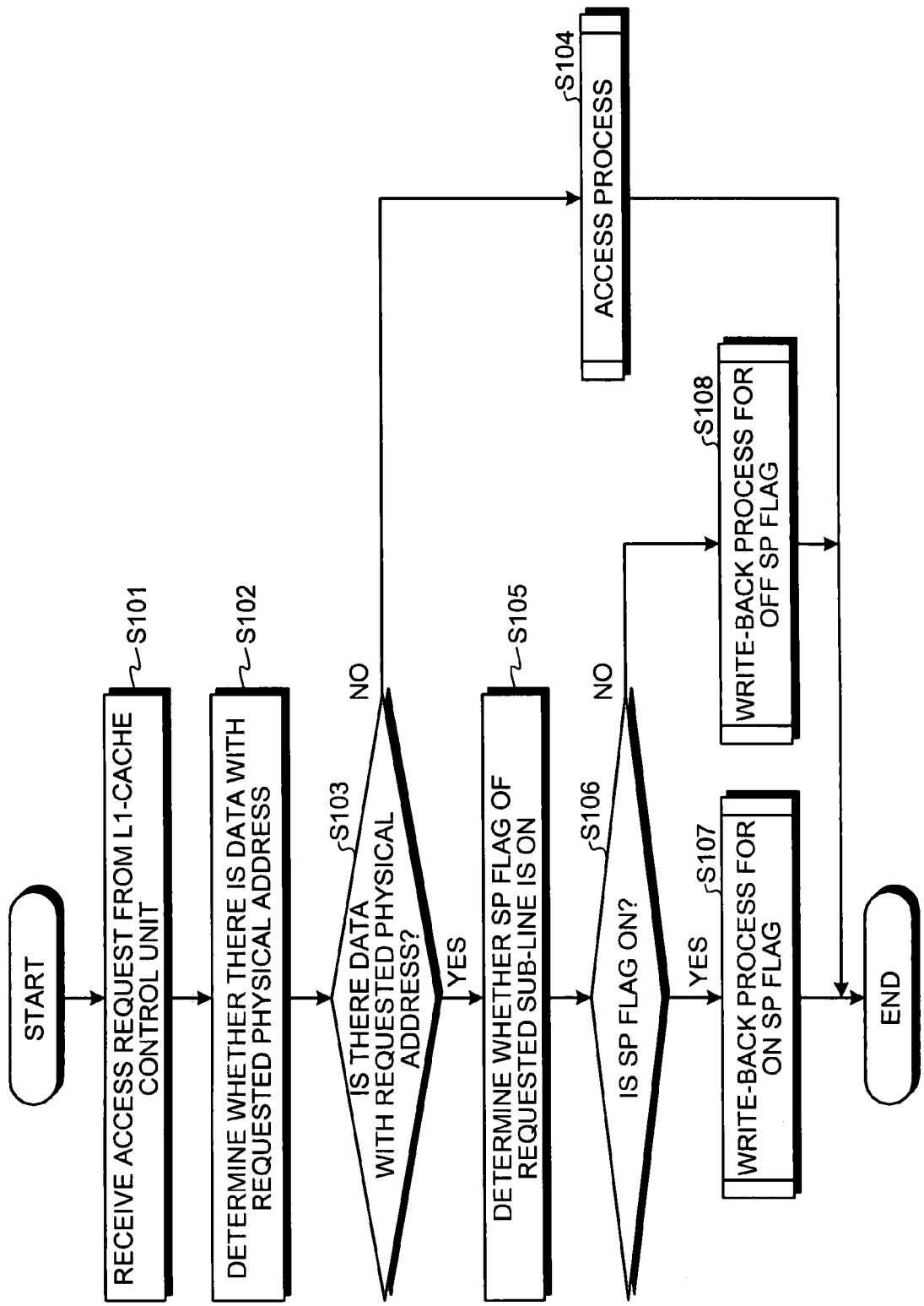
FIG. 20 is a flowchart of a process performed by the cache-memory control apparatus.

A procedure performed by the cache-memory control apparatus 100 is described below. FIG. 20 is a flowchart of a process performed by the cache-memory control apparatus 100.

The L2-cache control unit 13 receives an access request from the L1-cache control unit 12 (step S101), and determines whether there is data with a physical address specified by the request (step S102).

When there is no data with the physical address (No at step S103), the L2-cache control unit 13 performs a process for accessing the main memory unit 50 (step S104). When there is data with the physical address (Yes at step S103), the L2-cache control unit 13 determines whether a corresponding SP flag of the requested sub-line is ON (step S105).

When the corresponding SP flag of the requested sub-line is ON (Yes at step S106), a write-back process for ON SP flag is performed (step S107). When the corresponding SP flag is OFF (No at step S106), a write-back process for OFF SP flag is performed (step S108).

Figure 21:
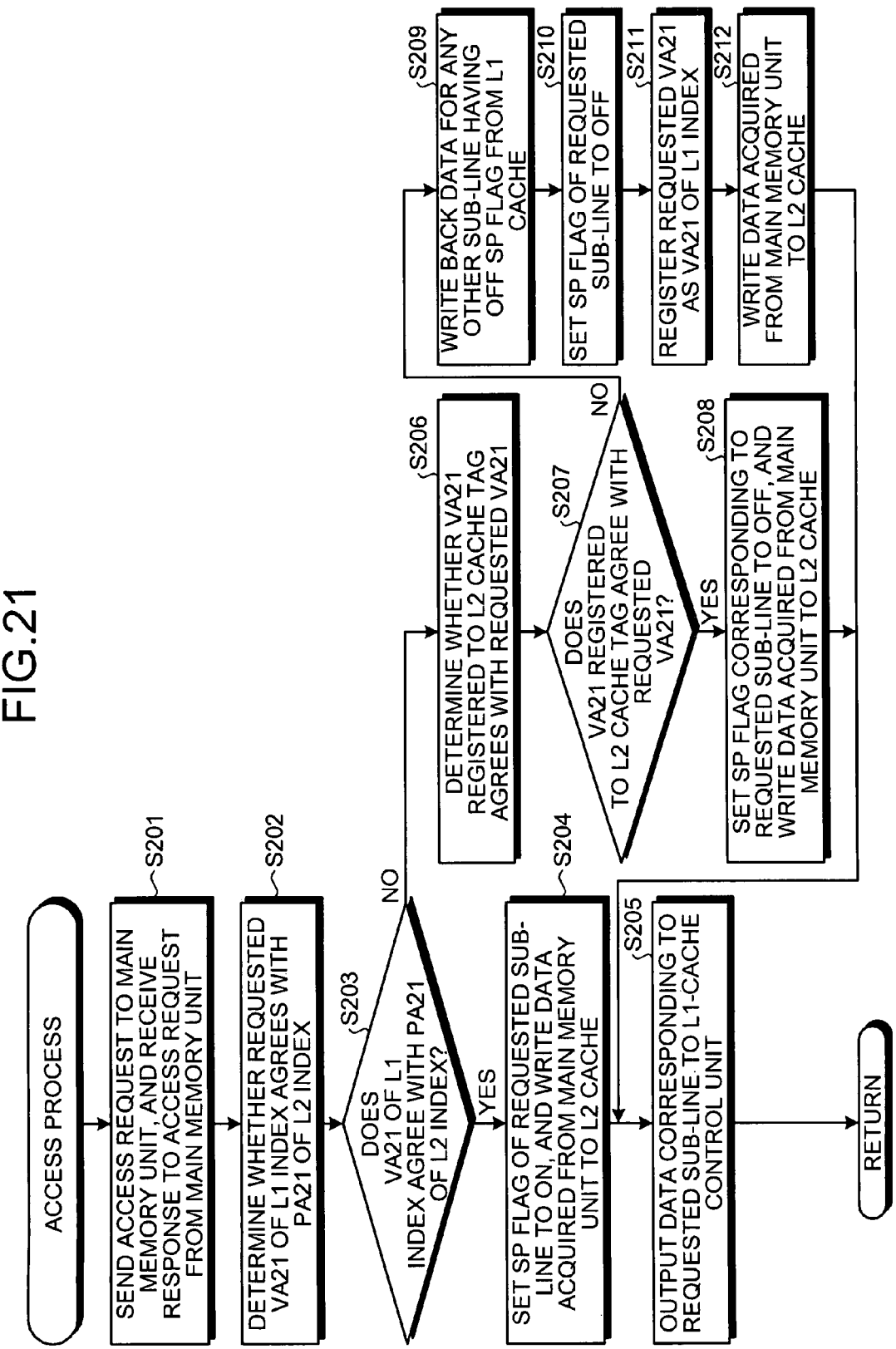
FIG. 21 is a detailed flowchart of an access process shown in FIG. 20.

The process for accessing the main memory unit 50 at step S104 in FIG. 20 is described below. FIG. 21 is a detailed flowchart of the access process. The L2-cache control unit 13 sends an access request to the main memory unit 50, and receives a response to the access request (step S201).

The L2-cache control unit 13 determines whether a part that belongs to a requested virtual page number (VA21) in the L1 index agrees with a part that belongs to a physical page number (PA21) in the L2 index (step S202).

When requested VA21 of the L1 index agrees with PA21 of the L2 index (Yes at step S203), the L2-cache control unit 13 sets the corresponding SP flag of the requested sub-line to ON, writes the data acquired from the main memory unit 50 to the L2 cache 13a (step S204), and outputs the data corresponding to the requested sub-line to the L1-cache control unit 12 (step S205).

When requested VA21 of the L1 index does not agree with PA21 of the L2 index (No at step S203), the L2-cache control unit 13 determines whether VA21 registered on the L2 cache tag agrees with requested VA21 (step S206).

When VA21 registered on the L2 cache tag agrees with requested VA21 (Yes at step S207), the L2-cache control unit 13 sets the corresponding flag of the requested sub-line to OFF, and writes the data acquired from the main memory unit 50 to the L2 cache 13a (step S208). Thereafter, the process proceeds to step S205.

When VA21 registered on the L2 cache tag does not agree with requested VA21 (No at step S207), if another sub-line of a line to which the requested sub-line belongs has a corresponding SP flag in a state of OFF, the L2-cache control unit 13 writes back data from the L1 cache 12a for any such a sub-line (step S209).

After that, the L2-cache control unit 13 sets the corresponding flag of the requested sub-line to OFF (step S210), registers VA21 of the requested virtual address as VA21 of L1 index to the L2 cache 13a (step S211), writes the data acquired from the main memory unit 50 to the L2 cache 13a (step S212). Thereafter, the process proceeds to step S205.

Figure 22:
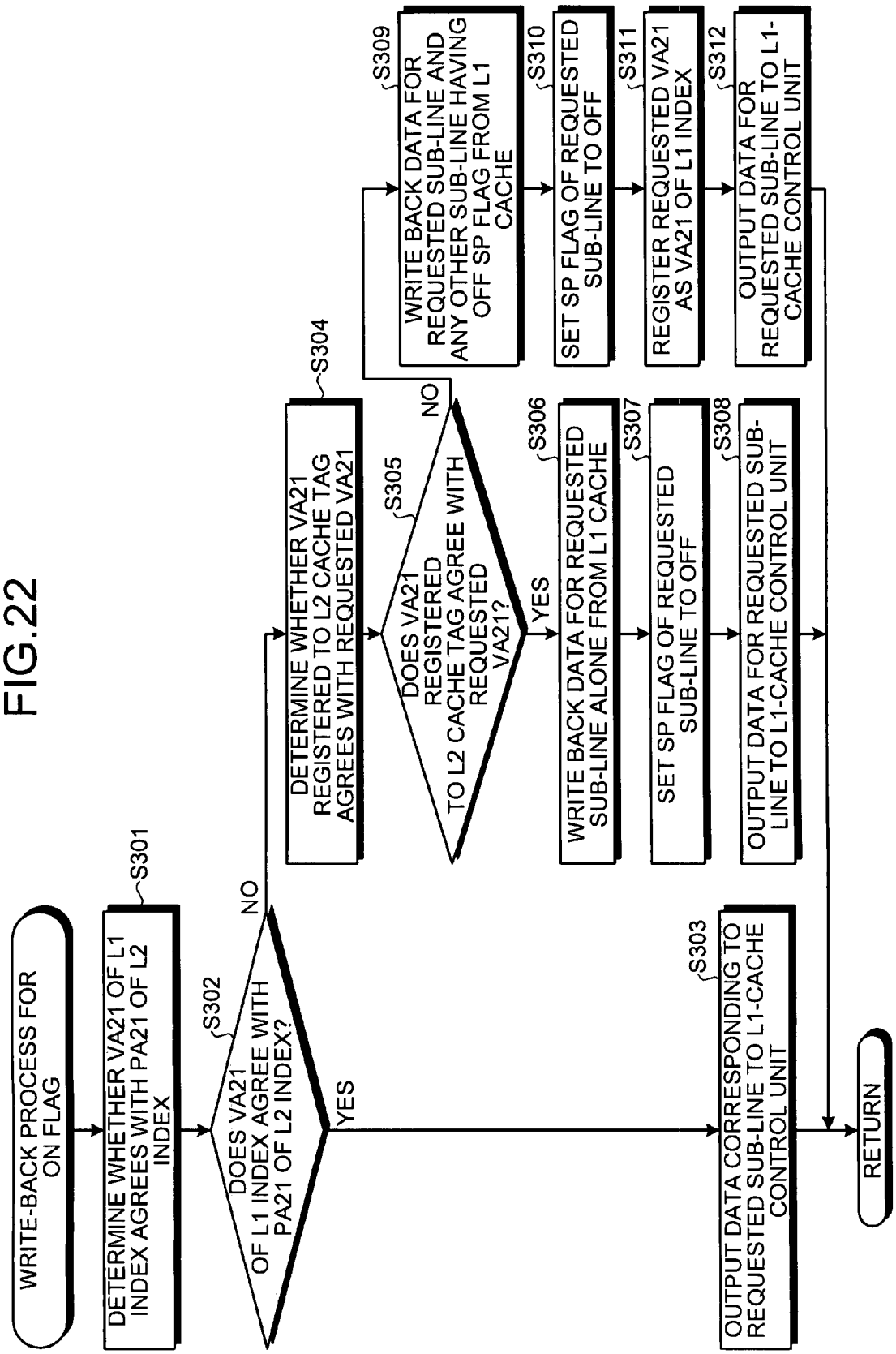
FIG. 22 is a detailed flowchart of a write-back process for ON flag shown in FIG. 20.

FIG. 22 is a detailed flowchart of the write-back process performed when the corresponding SP flag is ON at step S107 in FIG. 20. The L2-cache control unit 13 determines whether VA21 of the L1 index agrees with PA21 of L2 index (step S301).

When VA21 of the L1 index agrees with PA21 of the L2 index (Yes at step S302), the L2-cache control unit 13 outputs data corresponding to the requested sub-line to the L1-cache control unit 12 (step S303).

When VA21 of the L1 index does not agree with PA21 of the L2 index (No at step S302), the L2-cache control unit 13 determines whether VA21 registered on the L2 cache tag agrees with requested VA21 (step S304).

When VA21 registered on the L2 cache tag agrees with requested VA21 (Yes at step S305), the L2-cache control unit 13 writes back data for the requested sub-line alone from the L1 cache 12a (step S306), sets the corresponding SP flag of the requested sub-line to OFF (step S307), and outputs the data for the requested sub-line to the L1-cache control unit 12 (step S308).

When VA21 registered on the L2 cache tag does not agree with requested VA21 (No at step S305), if another sub-line of a line to which the requested sub-line belongs has a corresponding SP flag in an OFF state, the L2-cache control unit writes back data for the requested sub-line and for any such a sub-line from the L1 cache 12a (step S309).

After that, the L2-cache control unit 13 sets the corresponding flag of the requested sub-line to OFF (step S310), registers requested VA21 as VA21 of the L1 index to the L1 cache 12a (step S311), outputs the data for the requested sub-line to the L1-cache control unit 12 (step S312).

Figure 23:
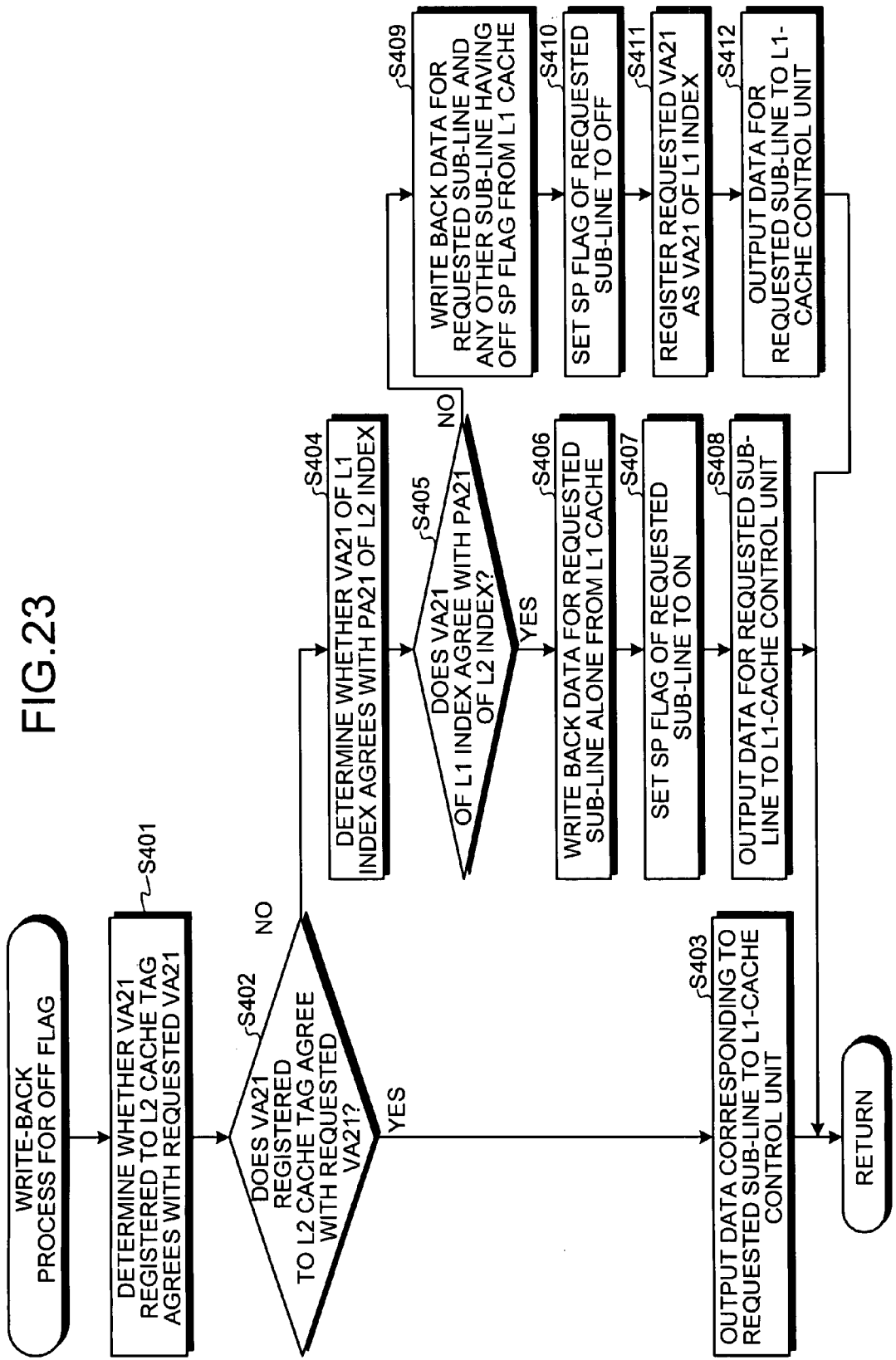
FIG. 23 is a detailed flowchart of a write-back process for OFF flag shown in FIG. 20.
Figure 26:
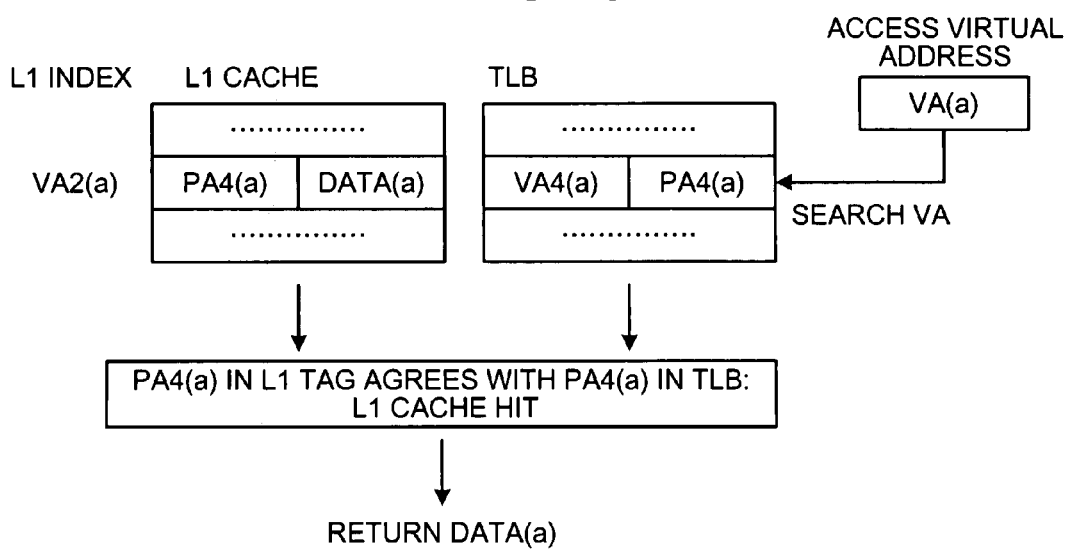

FIG. 23 is a detailed flowchart of the write-back process performed when the corresponding SP flag is OFF at step S108 in FIG. 20. The L2-cache control unit 13 determines whether VA21 registered on the L2 cache tag agrees with requested VA21 (step S401).

When VA21 registered on the L2 cache tag agrees with requested VA21 (Yes at step S402), the L2-cache control unit 13 outputs data corresponding to the requested sub-line to the L1-cache control unit 12 (step S403).

When VA21 registered on the L2 cache tag does not agree with requested VA21 (No at step S402), the L2-cache control unit 13 determines whether VA21 of the L1 index agrees with PA in L2 index (step S404).

When VA21 of the L1 index agrees with PA in L2 index (Yes at step S405), the L2-cache control unit 13 writes back data for the requested sub-line alone from the L1 cache 12a (step S406), sets the corresponding SP flag of the requested sub-line to ON (step S407), and outputs the data for the requested sub-line to the L1-cache control unit 12 (step S408).

When VA21 of the L1 index does not agree with PA21 of the L2 index (No at step S405), if another sub-line of a line to which the requested sub-line belongs has a corresponding SP flag in an OFF state, the L2-cache control unit writes back data for the requested sub-line and for any such a sub-line from the L1 cache 12a (step S409).

After that, the L2-cache control unit 13 sets the corresponding flag of the requested sub-line to OFF (step S410), registers requested VA21 as VA21 of the L1 index, (step S411); outputs the data for the requested sub-line to the L1-cache control unit 12 (step S412).

As described-above, the L2-cache control unit 13 writes back data based on the SP flag, which makes it possible to avoid interference between sub-lines having a common virtual address. Moreover, while an amount of required resource is less than that according to the method of adding a virtual address to each of the sub-lines, it is possible to improve performance of the cache-memory control apparatus 100 compared with the conventional method in which a set of sub-lines has a common virtual address and no SP flag.

As described above, the cache-memory control apparatus 100 adds the SP flag to each of the sub-lines. The L1-cache control unit 12 acquires an access virtual address from the command control unit 11, and outputs, when there is not data corresponding to the access virtual address, an L2 cache-access address to the L2-cache control unit 13. The L2-cache control unit 13 switches status of the SP flag based on a part that belongs to a virtual page number (VA21) in an L1 index and a part that belongs to a physical page number (PA21) in an L2 index, writes back data for a target sub-line from the L1 cache 12a based on status of the SP flag, and outputs data for a requested sub-line to the L1-cache control unit 12. This makes it possible to effectively utilize limited source of the L2 cache 13a, and eliminate an unnecessary write back of data (i.e., a process of deleting (writing back) data from the L1 cache 12a corresponding to any other sub-line in a single line to which the requested sub-line belongs).

Moreover, the cache-memory control apparatus 100 adds the SP flag to the L2 cache 13a to omit the unnecessary write back of data, which makes it possible to reduce a load on the L2-cache control unit 13 and execute a prompt response of data to the L1-cache control unit 12.

Of the-processes described in the embodiment, all or part of the processes explained as being performed automatically can be performed manually. Similarly, all or part of the processes explained as being performed manually can be performed automatically by a known method. The processing procedures, the control procedures, specific names, various data, and information including parameters described in the embodiment or shown in the drawings can be changed as required unless otherwise specified.

The constituent elements of the cache-memory control apparatus 100 shown in the drawings are merely conceptual, and need not be physically configured as illustrated. The constituent elements, as a whole or in part, can be divided or integrated either functionally or physically based on various types of loads or use conditions. The process functions performed by the device are entirely or partially realized by the CPU or computer programs that are analyzed and executed by the CPU, or realized as hardware by wired logic.

As set forth hereinabove, according to an aspect of the present invention, it is possible to effectively utilize limited resources of a cache memory, and eliminate an unnecessary write-back of data. In other words, only a sub-line containing requested data can be transferred from a second cache to a first cache, rather than the entire cache line.

Moreover, it is possible to specify a sub-line not requiring a write back of data by using a one-bit control flag. The control flag can be set properly even if requested data is not stored in the second cache.

Although the invention has been described with respect to a specific embodiment for a complete and clear disclosure, the appended claims are not to be thus limited but are to be construed as embodying all modifications and alternative-constructions that may occur to one skilled in the art that fairly fall within the basic teaching herein set forth.

What is claimed is:

1. A cache-memory control apparatus that controls a first cache and a second cache having a cache line that is divided into a plurality of sub-lines each for storing data from the first cache, the cache-memory control apparatus comprising:
a flag switching unit that receives a request for data, and switches, when requested data is not stored in the first cache, a state of a control flag for a corresponding sub-line based on a virtual address of the requested data and a physical address corresponding to the virtual address; and
a control unit that writes back the corresponding sub-line to the first cache based on the state of the control flag.

2. The cache-memory control apparatus according to claim 1, wherein
the control flag indicates ON or OFF; and
the flag switching unit sets the control flag ON when part of the virtual address matches part of the physical address.

3. The cache-memory control apparatus according to claim 2, wherein the flag switching unit sets the control flag OFF when the part of the virtual address does not match the part of the physical address.

4. The cache-memory control apparatus according to claim 1, wherein the control unit writes back the corresponding sub-line to the first cache when the control flag is OFF.

5. The cache-memory control apparatus according to claim 1, further comprising a data acquiring unit that acquires, when the requested data is not stored in the second cache, the requested data from a main memory unit, wherein
the flag switching unit switches the state of the control flag based on a physical address of data acquired by the data acquiring unit and a virtual address of the requested data.

6. The cache-memory control apparatus according to claim 1, wherein the flag switching unit switches the state of the control flag based on part of the virtual address corresponding to a virtual page number and part of the physical address corresponding to a physical page number.

7. A cache-memory control method for controlling a first cache and a second cache having a cache line that is divided into a plurality of sub-lines each for storing data from the first cache, the cache-memory control method comprising:
adding a control flag to each of the sub-lines;
receiving a request for data;
switching, when requested data is not stored in the first cache, a state of a control flag for a corresponding sub-line based on a virtual address of the requested data and a physical address corresponding to the virtual address; and writing back the corresponding sub-line to the first cache based on the state of the control flag.

8. The cache-memory control method according to claim 7, wherein the control flag indicates ON or OFF, and the switching includes setting the control flag ON when part of the virtual address matches part of the physical address.

9. The cache-memory control method according to claim 8, wherein the switching includes setting the control flag OFF when the part of the virtual address does not match the part of the physical address.

10. The cache-memory control method according to claim 7, wherein the writing back includes writing back the corresponding sub-line to the first cache when the control flag is OFF.

11. The cache-memory control method according to claim 7, further comprising acquiring the requested data from a main memory unit when the requested data is not stored in the second cache, wherein the switching includes switching the state of the control flag based on a physical address of data acquired at the acquiring and a virtual address of the requested data.

12. The cache-memory control method according to claim 7, wherein the switching includes switching the state of the control flag based on part of the virtual address corresponding to a virtual page number and part of the physical address corresponding to a physical page number.

13. A computer-readable recording medium that stores therein a computer program for controlling a first cache and a second cache having a cache line that is divided into a plurality of sub-lines each for storing data from the first cache, the computer program causing a computer to execute:

adding a control flag to each of the sub-lines;

receiving a request for data;

switching, when requested data is not stored in the first cache, a state of a control flag for a corresponding sub-line based on a virtual address of the requested data and a physical address corresponding to the virtual address; and writing back the corresponding sub-line to the first cache based on the state of the control flag.

14. The computer-readable recording medium according to claim 13, wherein the control flag indicates ON or OFF, and the switching includes setting the control flag ON when part of the virtual address matches part of the physical address.

15. The computer-readable recording medium according to claim 14, wherein the switching includes setting the control flag OFF when the part of the virtual address does not match the part of the physical address.

16. The computer-readable recording medium according to claim 13, wherein the writing back includes writing back the corresponding sub-line to the first cache when the control flag is OFF.

17. The computer-readable recording medium according to claim 13, further comprising acquiring the requested data from a main memory unit when the requested data is not stored in the second cache, wherein the switching includes switching the state of the control flag based on a physical address of data acquired at the acquiring and a virtual address of the requested data.

18. The computer-readable recording medium according to claim 13, wherein the switching includes switching the state of the control flag based on part of the virtual address corresponding to a virtual page number and part of the physical address corresponding to a physical page number.

* * * * *